US011323447B2

(12) United States Patent
Durbin et al.

(10) Patent No.: US 11,323,447 B2
(45) Date of Patent: May 3, 2022

(54) DIGITAL DATA ACCESS CONTROL AND AUTOMATED SYNTHESIZATION OF CAPABILITIES

(71) Applicant: HEXAGON TECHNOLOGY CENTER GMBH, Heerbrugg (CH)

(72) Inventors: Mark Durbin, Tadmarton (GB); Asif Rana, Heerbrugg (CH); Bernd Reimann, Heerbrugg (CH); Utz Recke, Heerbrugg (CH); George Kenneth Thomas, Madison, AL (US)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 16/924,100

(22) Filed: Jul. 8, 2020

(65) Prior Publication Data

US 2021/0014231 A1 Jan. 14, 2021

(30) Foreign Application Priority Data

Jul. 9, 2019 (EP) ..................................... 19185321
Dec. 23, 2019 (EP) ..................................... 19219535

(51) Int. Cl.
*H04L 29/08* (2006.01)
*H04L 29/06* (2006.01)
(Continued)

(52) U.S. Cl.
CPC ........ *H04L 63/101* (2013.01); *H04L 63/0876* (2013.01); *H04L 63/20* (2013.01); *H04L 67/1097* (2013.01); *H04L 67/42* (2013.01)

(58) Field of Classification Search
CPC .... G06F 21/6218; G06F 21/88; G06F 21/604; H04W 12/06; H04W 12/37;
(Continued)

(56) References Cited

U.S. PATENT DOCUMENTS 7,735,060 B2 6/2010 Harvey et al.
RE44,746 E * 2/2014 Adams .................. H04W 12/37
455/418
(Continued)

FOREIGN PATENT DOCUMENTS

DE 102016103713 A1 9/2016
EP 3156898 A1 4/2017
(Continued)

OTHER PUBLICATIONS

Tataroiu et al.: "Remote Monitoring and Control of Wireless Sensor", May 31, 2009.
(Continued)

*Primary Examiner* — Chirag R Patel
(74) *Attorney, Agent, or Firm* — Maschoff Brennan

(57) ABSTRACT

A computer system for controlling access to digital data and algorithms, including a multitude of local systems provided at a plurality of remote locations. At least a first subset of the multitude of local systems comprises at least one data acquisition device adapted to generate and provide raw digital data. At least a second subset of the multitude of local systems comprises at least one data processing unit having a memory with a memory capacity and a processor with a computing capacity to process raw digital data to generate processed digital data to be presented to one or more of a plurality of users of the system. The system also includes a filter system, wherein at least one filter is assigned at each local system, each filter having a filter setting for restricting and prohibiting data transfer between the assigned local system and other local systems.

10 Claims, 24 Drawing Sheets

(51) Int. Cl.
*H04L 67/01* (2022.01)
*H04L 67/1097* (2022.01)

(58) Field of Classification Search
CPC ... H04L 63/101; H04L 63/0876; H04L 67/42; H04L 67/1097; H04L 63/20
See application file for complete search history.

(56) References Cited

U.S. PATENT DOCUMENTS

| | | | |
|---|---|---|---|
| 9,792,140 | B2 | 10/2017 | Goceck et al. |
| 2008/0005287 | A1 | 1/2008 | Harvey |
| 2008/0005729 | A1 | 1/2008 | Harvey |
| 2008/0010631 | A1 | 1/2008 | Harvey |
| 2016/0323392 | A1* | 11/2016 | Lawson .............. G06F 16/9535 |

FOREIGN PATENT DOCUMENTS

| | | |
|---|---|---|
| EP | 3522003 A1 | 8/2019 |
| EP | 3522015 A1 | 8/2019 |
| EP | 3579161 A1 | 12/2019 |

OTHER PUBLICATIONS

Edge Frontier Fact Sheet, Intergraph Corporation, 2013.
European Search Report dated Dec. 4, 2019 as received in application No. 19185321.
European Search Report dated May 18, 2020 as received in application No. 19219535.

* cited by examiner

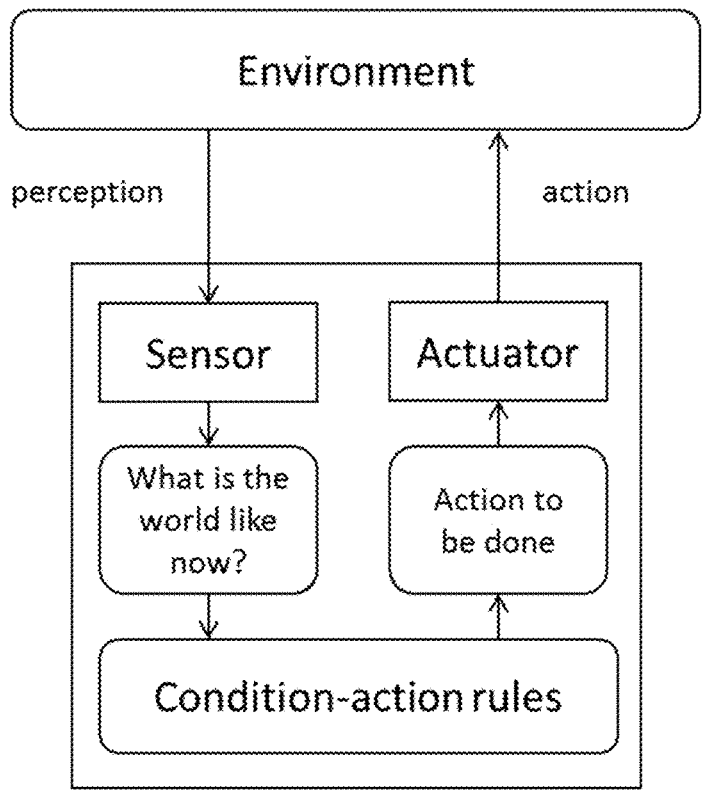
Fig. 18a
Fig. 18b
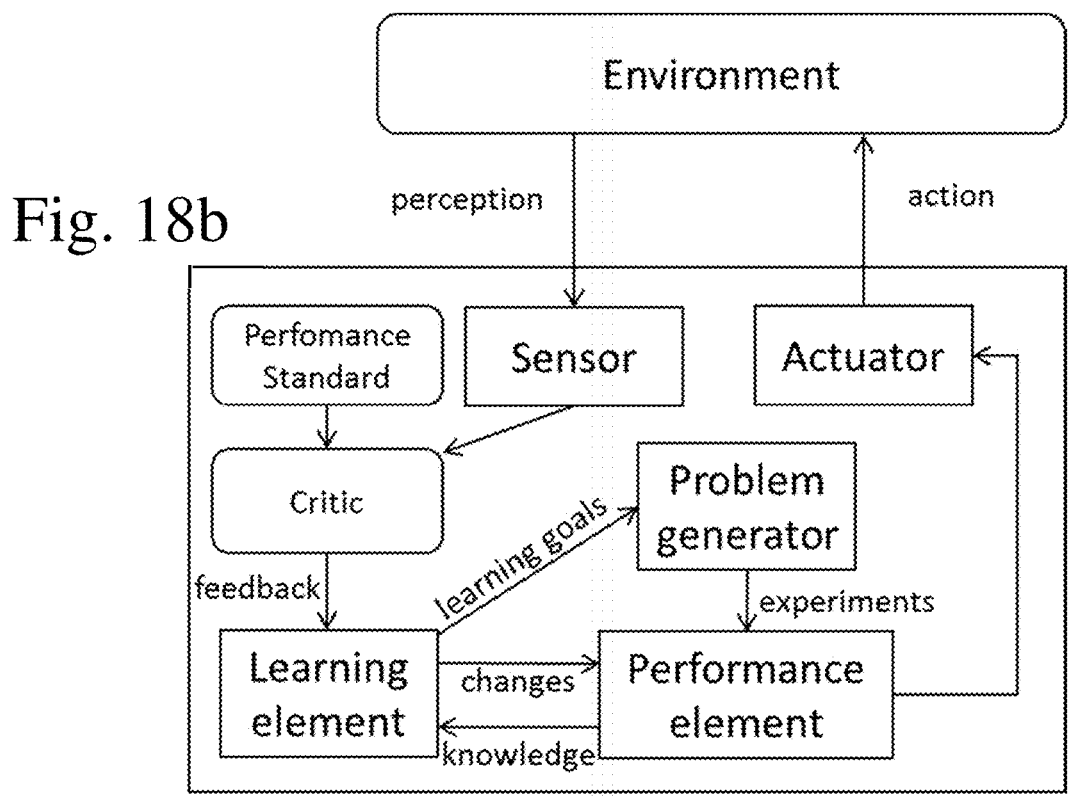

| Agents | Capabilities | Example API Functions | Scenarios |
|---|---|---|---|
| Car | Movement, Transportation, Temperature | setPosition(latitude, longitude) getTemperature() | Car is assigned a movement task A but cannot perform this task |
| Drone | Movement, Imaging, Temperature | setLongitude(longitude) setLatitude(latitude) getCurrentTemperature() | free |
| Laser Tracker | Distance, Temperature, Vibration | setFocus(x, y, z) getTemperature() getVibration() | free |

FIG. 19a

| Agents | Min(Levenshtein distance of all agent function to getTemperature of Car agent) | Fraction(Stdev / Mean for function that has least Levenshtein Distance to getTemperature) | Distance to Car in VectorSpace |
|---|---|---|---|
| Car | 0 | 10 (getTemperature) | 0 |
| Drone | 10 (getTemperatureFahrenheit) | 12 (getTemperatureFahrenheit) | 10 |
| Laser Tracker | 7 (getTemperature) | 2 (getTemperature) | 30 |

FIG. 19b

DIGITAL DATA ACCESS CONTROL AND AUTOMATED SYNTHESIZATION OF CAPABILITIES

CROSS-REFERENCE TO RELATED APPLICATIONS

This application claims priority to European Patent Application No. 19185321.7, filed on Jul. 9, 2019 and European Patent Application No. 19219535.2 filed on Dec. 23, 2019. The foregoing patent applications are herein incorporated by reference.

FIELD OF THE INVENTION

The present invention generally pertains to computer systems and computer-implemented methods. More specifically, a first aspect of the invention pertains to a computer system and to a computer-implemented method for controlling access to digital data and algorithms A second aspect of the invention pertains to a computer system and to a computer-implemented method for automatically identifying capabilities of a group of electronic devices, particularly capabilities that are needed or useful for performing a given task or a part thereof.

BACKGROUND OF THE INVENTION

In the field of distributed digital services, due to their global distribution, the decision whether to localise data and algorithms at the "edge" or in the "cloud" becomes an important issue in terms of management and quick availability of the data and algorithms, mainly dominated by technical limitations like transmission, but also in view of the legal situation as a plurality of jurisdictions might be potentially affected and various legal or contractual provisions may apply. Data may be generated with a local device in a certain place with local constraints and limitations, e.g. regarding processing power or implemented algorithms, and subsequently transferred to another location where further data processing is performed and new data and information are generated. In turn, data and information will be sent back to the local device where the process originated. The flow of data, algorithms, software modules or libraries may occur across national borders and jurisdictions and may be difficult to follow or even control. Legal constraints may directly affect the implementation of technical solutions, e.g. in case of international sanctions or technology export restrictions. This means that it has to be ensured that technology, data and algorithms remain within the domains where they may be lawfully shared. Therefore, a corresponding computer system has to provide a controlled access to digital data and algorithms which automatically prevent misuse and misallocation.

In the patent application EP18155182.1, a system "Edge Client" (EC) is described that provides extensible Internet of Things (IoT) edge solution, process automation, secure edge connectivity and dynamically changeable workflows. It can be used together with a system and data integration software such as "EdgeFrontier" (EF) of Intergraph Corp., Huntsville. Some integration tools that can be used with EC are disclosed in documents EP 3 156 898 A1, US 2008/0005287 A1, US 2008/0010631 A1 or U.S. Pat. No. 7,735,060 B2.

Since the locations may be scattered around the world, data and algorithms from a multitude of different locations and jurisdictions may be involved, whereby problems may arise from this distribution, particularly due to different technical constraints, legal frameworks or technology transfer restrictions.

A precondition for identifying capabilities is that they are previously unknown to the computer system. In many cases this includes that also the identities of the electronic devices themselves are unknown.

The electronic devices may be IoT-devices that are connectable to the Internet (IoT=Internet of Things). The devices need to have at least a minimum connectivity so as to allow the computer system to establish some kind of data connection with the devices.

In EP 3 522 003 A1, a system "Edge Client" (EC) is described that provides extensible Internet of Things (IoT) edge solution, process automation, secure edge connectivity and dynamically changeable workflows. It can be used together with a system and data integration software such as "EdgeFrontier" (EF) of Intergraph Corp., Huntsville. Some integration tools that can be used with EC are disclosed in documents EP 3 156 898 A1, US 2008/0005287 A1, US 2008/0010631 A1 or U.S. Pat. No. 7,735,060 B2.

EP 3 522 015 A1 describes a system and method to generate a workflow, wherein the devices that are considered in the workflow generation are self-describing. The devices are enabled to provide information about their identity, capabilities and workload to the system. This enables automated workflow generation. The system requires that compatible software agents are provided in the devices to connect them to the system and make them self-describing. This can be done by installing the agents on the devices or connecting modules with an agent installed on each module to the devices. The method described in said document EP 3 522 015 A1 however does not work for devices that do not have such an agent and cannot be equipped with such an agent.

SUMMARY OF THE INVENTION

Distributed Digital Services

It is therefore an object of some aspects of the present invention to provide an improved method and system for controlling access to digital data.

It is a particular object of some embodiments the present invention to provide such a method and system that reduces or eliminates legal risks when transferring data between remote locations.

It is another object of some embodiments of the present invention to provide such a method and system that allow customizing processing data, particularly raw data, according to the needs of a requester or according to a role of the requester. In this context, raw data comprises data generated or initially processed at a particular location in a first step, with more steps, particularly processing steps, to follow at the same or different locations.

A system according to one aspect of the invention may be configured, deployed and operated using a Computer Aided System Engineering (CASE) tool, which provides the ability to abstract complexity and system differences into an easily understandable series of diagrams. Through interoperation of several platforms that are collectively configured, deployed and operated using a common CASE tool, autonomous connected ecosystems (ACE) can be created, i.e. a state where data is connected seamlessly through the convergence of the physical world and its digital realization, with intelligence built-in to all processes from the core system to the edge of the network.

Thus, a system according to the first aspect of the invention may comprise a system of filters that prevent outbound and inbound data transfer depending on a location or a role of the requester or sender of the data. In the context of this application, a filter can be a collection of processes or functions that take any number of inputs and output a subset or derived set of data based on those inputs.

Further, a system according to the first aspect of the invention may provide information-restricted or information-reduced, i.e. "abstracted", versions of the requested data, wherein information that is critical, e.g. in view of the legal frameworks, e.g. due to provisions on data protection, or technology transfer restrictions, is deleted, encrypted or aggregated in the abstracted versions. Aggregating data in this context particularly means replacing a group of observations with a summary statistics based on those observations. For instance, instead of a multitude of values, each being assigned identifiably to a person, device or location, only aggregate data such as a mean value of all values is provided.

A system according to the first aspect of the invention may comprise a decision engine for controlling a distribution of raw data to a plurality of remote data processing units in order to be processed and provided to a requester. The decision engine not only considers technical requirements but also filter settings of the system of filters to decide where to transfer what data to best meet the requirements of the requester. Particularly, the decision engine operates over multiple distributed cooperating nodes all partaking in the decision process.

A first sub-aspect of the first aspect of the invention relates to a computer system for controlling access to digital data, the system comprising a multitude of local systems that are provided at a plurality of remote locations and have a data connection that allows transferring digital data between the local systems.

At least a first subset of the multitude of local systems comprises at least one data acquisition device that is adapted to generate and provide raw digital data. At least a second subset of the multitude of local systems comprises at least one data processing unit having a memory with a memory capacity and a processor with a computing capacity. Each data processing unit is configured to process raw digital data and to generate processed digital data to be presented to one or more of a plurality of users of the system, each user having one of a plurality of roles.

According to this sub-aspect of the invention the system further comprises a filter system comprising a multitude of filters. At least one filter is assigned to each local system, each filter having a filter setting for restricting and prohibiting data transfer between the assigned local system and other local systems, the filter setting considering at least a legal framework applicable at the location of the assigned local system. Particularly, a set of two filters realizing bi-directional—i.e. in—and outbound—filtering capability is assigned to each local system. The computer system, e.g. within the filter layer, is configured to generate one or more abstracted versions of a set of raw or processed digital data, wherein generating an abstracted version comprises deleting, encrypting or aggregating, based on one or more of the filter settings, information from the set of raw or processed digital data.

Considering the legal framework may comprise considering statutory provisions as well as contractual provisions, e.g. obligations restricting the use of data or information derived therefrom.

According to one embodiment, the computer system comprises a distribution engine that is provided, e.g., on a server computer at one or more of the plurality of locations and/or by means of cloud computing. The decision engine is configured, upon receiving a request to present a first set of digital data to a first user, to decide in real time and based at least on the filter settings, at which one or more data processing units raw data is to be processed to generate the first set of digital data that is to be presented to the first user.

According to another embodiment of the computer system, the decision engine is configured to decide at which one or more data processing units the raw data is to be processed to generate the first set of processed digital data also based on the role of the first user, in particular wherein the decision engine is further configured to decide in real time which information is included in the first set of digital data and how the information is presented to the first user, particularly wherein presenting the information comprises generating and presenting at least one diagram.

According to another embodiment of the computer system, for deciding at which data processing unit raw data is to be processed, the decision engine is configured to execute an optimization based on the filter setting of each local system and further takes into consideration at least a subset of a necessary or desirable processing speed, a network latency, a role of the first user, a necessary or desirable detail level of the raw and/or processed digital data, and a utilization of the memory capacities and/or computing capacities of the computing units.

In one embodiment, the decision engine is configured to execute the optimization based on an actual and/or forecasted amount of raw digital data provided by the measuring devices and/or processed digital data requested to be presented.

According to one embodiment of the computer system, the at least one data acquisition device comprises at least one measuring device that is adapted to generate and provide measuring data as raw digital data. Each data processing unit is configured to process the measuring data and to generate processed measuring data to be presented to the one or more users.

According to another embodiment of the computer system, the filter settings are defined considering legal frameworks applicable at a plurality of locations and/or provisions of a contract applicable at least at the location of the assigned local system. Deleting information from the set of raw or processed digital data is then based on the legal frameworks and/or contracts and particularly comprises deleting, encrypting or aggregating—according to the terms of the legal frameworks or contracts—at least one of personal data, information being considered as trade secrets, and information that is subject to technology transfer restrictions. This also applies to technology and its processing being used outside of a certain jurisdiction and to technology export control.

According to another embodiment of the computer system, filter settings are defined for all possible combinations or at least for a subset of possible combinations of user roles and remote locations, for instance for at least four combinations (e.g. for two roles and two locations) or at least twelve combinations (e.g. for three roles and four locations or vice versa). In particular, for each of these combinations filter settings are defined for a present point or period of time and at least one future point or period of time, thereby considering at least a legal framework applicable at the location of the assigned local system at the present point or period of time and the at least one future point or period of time. Such setting may reflect the dynamic changes of the legal framework, e.g. due to new legal provisions entering into force, or due to contractual obligations, such as e.g. confidentiality terms, expiring.

According to another embodiment of the computer system, a first local system of the multitude of local systems comprises a plurality of software agents that are adapted to be used with a plurality of electronic apparatuses that are configured as data acquisition devices, particularly as measuring devices, wherein each software agent is installable on an electronic apparatus of the plurality of electronic apparatuses or installed on a communication module that is adapted to be connected to one of the electronic apparatuses and to exchange data with the apparatus connected to, wherein each software agent is adapted to exchange data with the electronic apparatus it is installed on or connected to.

A second sub-aspect of the first aspect of the invention relates to a server computer as part of a computer system for controlling access to digital data, such as the computer system of the first sub-aspect. The computer system comprises a multitude of local systems that are provided at a plurality of remote locations and have a data connection that allows transferring digital data between the local systems, wherein at least a first subset of the multitude of local systems comprises at least one data acquisition device that is adapted to generate and provide raw digital data, at least a second subset of the multitude of local systems comprises at least one data processing unit having a memory with a memory capacity and a processor with a computing capacity, and each data processing unit is configured to process raw digital data and to generate processed digital data to be presented to one or more of a plurality of users of the system, each user having one of a plurality of roles. The system comprises a filter system comprising a multitude of filters, wherein at least one filter is assigned at each local system, each filter having a filter setting for restricting and prohibiting data transfer between the assigned local system and other local systems, the filter setting considering at least a legal framework applicable at the location of the assigned local system.

According to this sub-aspect, the server computer comprises a decision engine that is configured—upon receiving a request to present a first set of digital data to a first user—to decide in real time and based at least on the filter settings, at which one or more data processing units raw data is to be processed to generate the first set of digital data.

A third sub-aspect of the first aspect of the invention relates to a client computer as part of a computer system for controlling access to digital data, such as the computer system of the first sub-aspect. The system comprises a multitude of local systems that are provided at a plurality of remote locations and have a data connection that allows transferring digital data between the local systems, wherein the client computer is part of a first local system at a first location. At least a first subset of the multitude of local systems comprises at least one data acquisition device that is adapted to generate and provide raw digital data, and at least a second subset of the multitude of local systems comprises at least one data processing unit having a memory with a memory capacity and a processor with a computing capacity, wherein each data processing unit is configured to process raw digital data and to generate processed digital data to be presented to one or more of a plurality of users of the system, each user having one of a plurality of roles.

The first local system comprises at least a first data acquisition device or a first data processing unit, and the client computer is assigned to the first data acquisition device and/or to the first data processing unit of the first local system. According to this sub-aspect, the client computer comprises a first filter, particularly wherein the first filter is part of a filter system of the computer system comprising a multitude of filters. The first filter has a filter setting for restricting and prohibiting data transfer between the client computer and other local systems, i.e. for restricting and prohibiting transfer of raw digital data generated by the first data acquisition device and/or processed digital data generated by the first data processing unit, respectively, wherein the filter setting is defined considering at least a legal framework applicable at the first location.

The client computer is configured to generate one or more abstracted versions of a set of raw or processed digital data, wherein generating an abstracted version comprises deleting, encrypting and/or aggregating, based on the filter setting, information from the set of raw or processed digital data. Moreover, the client computer is configured to provide, upon receiving a request to transfer a first set of digital data to a second local system and depending on the filter setting, the first set of digital data or an abstracted version of the first set of digital data to the second local system.

According to one embodiment, the client computer is configured, upon receiving the request to transfer the first set of digital data to a second local system, to delete, based on the filter setting, information from the set of raw or processed digital data to generate the abstracted version of the first set of digital data, and to provide the abstracted version to the second local system.

According to another embodiment, the client computer comprises a computing unit, a memory unit and a first communication unit. In a particular embodiment, the first local system comprises a plurality of software agents that are adapted to be used with a plurality of electronic apparatuses that are configured as data acquisition devices, particularly as measuring devices, wherein each software agent is installable on an electronic apparatus of the plurality of electronic apparatuses or installed on a communication module that is adapted to be connected to one of the electronic apparatuses and to exchange data with the apparatus connected to. Each software agent is adapted to exchange data with the electronic apparatus it is installed on or connected to, and the first communication unit and the software agents are configured to exchange data between the electronic apparatuses and the client computer.

The computer system according to the first sub-aspect of course may comprise one or both of the server computer and client computer of the second and third sub-aspects of the first aspect of the invention.

A fourth sub-aspect of the first aspect of the invention relates to a computer-implemented method for controlling access to digital data using a computer system, such as the computer system according to the first sub-aspect. The computer system comprises a multitude of local systems that are provided at a plurality of remote locations and have a data connection that allows transferring digital data between the local systems, wherein at least a first subset of the multitude of local systems comprises at least one data acquisition device that is adapted to generate and provide raw digital data, at least a second subset of the multitude of local systems comprises at least one data processing unit having a memory with a memory capacity and a processor with a computing capacity, each data processing unit is configured to process raw digital data and to generate processed digital data to be presented to one or more of a plurality of users of the system, each user having one of a plurality of roles, and the computer system comprises a filter system comprising a multitude of filters, wherein at least one filter is assigned at each local system.

According to this sub-aspect, the method comprises defining a filter setting for each filter based at least on a legal framework applicable at the location of the local system to which the filter is assigned, the filter setting restricting and/or prohibiting data transfer between the assigned local system and other local systems, and deciding, upon receiving a request to present a first set of digital data to a first user, in real time, by means of a decision engine and based at least on the filter settings, at which one or more data processing units raw data is to be processed to generate the first set of digital data.

According to one embodiment, the method comprises processing, according to the decision, the raw data at the one or more data processing units to generate the first set of digital data, and presenting the first set of digital data to the first user.

According to another embodiment, the method further comprises deciding in real time, by means of the decision engine and based on the role of the first user which information is included in the first set of digital data and how the information is presented to the first user, particularly wherein presenting the information comprises generating and presenting at least one diagram.

According to another embodiment, the method further comprises deciding at which one or more data processing units raw data is to be processed to generate the first set of digital data is also based on the role of the first user.

A fifth sub-aspect of the first aspect of the invention pertains to a computer programme product comprising programme code which is stored on a machine-readable medium, or being embodied by an electromagnetic wave comprising a programme code segment, and having computer-executable instructions for performing, in particular when run on a computer system according to the first aspect of the invention, the method according to the fourth aspect of the invention.

Capability Identification

It is therefore an object of some aspects of the invention the present invention to provide an improved method and system for identifying capabilities of electronic devices.

It is a further object of some aspects of the invention to provide such a method and system that allow to identify capabilities without involving human interaction, e.g. fully automatically.

It is a further object of some aspects of the invention to provide such a method and system that allow to identify capabilities that are not designated capabilities of an apparatus, e.g. unintended capabilities or side-effects of a designated capability.

It is another object of some aspects of the invention to provide such a method and system that allow synthesizing new capabilities from capabilities identified in one or more devices.

It is yet another object of some aspects of the invention to provide such a method and system that allow performing a workflow using yet unidentified capabilities.

A first sub-aspect of the second aspect of the invention relates to a computer system for identifying capabilities of a group of electronic devices, each device of said group having one or more capabilities, at least a first subset of the devices of the group being connected to a middle-ware platform by means of a data link. According to this sub-aspect, the computer system comprises a device catalog listing known devices and capabilities of each listed device; and an observer module having access to data streams between the middle-ware platform and the subset of the devices and being configured to observe the data streams.

The observer module is configured to identify, based on the observed data streams and using artificial intelligence, capabilities of the devices of the subset, wherein the device catalog is updated with the identified capabilities.

In some embodiments, the computer system further comprises a capability catalog listing capabilities available in the group, wherein also the capability catalog is updated with the identified capabilities.

According to one embodiment, the computer system comprises a capabilities definition catalog providing definitions for synthesized capabilities and/or rules for constituting synthesized capabilities, wherein synthesized capabilities are capabilities that can be constituted based on other capabilities, e.g. be combined from capabilities listed in the capability catalog; and a capability synthesizing module configured to synthesize, based on the information from the capability definition catalog and based on capabilities available in the group, synthesized capabilities, wherein the synthesized capabilities are then stored in the device catalog and in the capability catalog.

In one embodiment, said capabilities definition catalog also provides definitions of capabilities that are not synthesized capabilities. In another embodiment, the capabilities definition catalog is updated with identified capabilities that are not yet defined in the capabilities definition catalog. In one embodiment, the capability synthesizing module is configured to update the capabilities definition catalog with definitions for synthesized capabilities.

In another embodiment, the observer module is configured to repeat identifying the capabilities after a pre-defined time interval and/or upon receiving a trigger, for instance wherein the trigger comprises information about a change related to the devices (e.g. a device being added to or removed from the group).

According to another embodiment of the computer system, at least a second subset of the devices of the group are smart devices, each smart device comprising self-describing functions configured for disclosing capabilities of the device, and the computer system further comprises a capability detection module configured for detecting the capabilities of the smart devices utilizing the self-describing functions and for updating the device catalog and the capability catalog with the detected capabilities.

In one embodiment, said capability detection module is further configured to receive identified capabilities from the observer module and to update the device catalog and the capability catalog with the identified capabilities, and/or to receive synthesized capabilities from the capability synthesizing module and to update the device catalog and the capability catalog with the synthesized capabilities.

According to another embodiment of the computer system, the devices comprise at least one or more first devices or second devices and at least one or more third devices, wherein first devices, e.g. being smart devices, are configured to grant the computer system access to a data storage of the respective first device, in particular wherein a compatible software agent is installed on the first devices, second devices are equipped with a module that is configured to exchange data with the device and to grant the computer system access to a data storage of the respective second device, e.g. so that the second devices become smart devices, in particular wherein a compatible software agent is installed on the module, and third devices are devices that are neither first devices nor second devices, i.e. are not smart devices.

According to another embodiment, the computer system comprises at least one discovery algorithm that is configured to use and has access to artificial intelligence (AI) for determining a type of device and/or for determining capabilities of the device that are not designated capabilities, e.g. synthesized capabilities;

at least one data base comprising information about attributes of a multitude of known types of devices; and/or hacking tools for obtaining access to a data storage unit of the device and/or reconfiguring the device.

In one embodiment, the observer module comprises said discovery algorithm or has access to a platform providing the discovery algorithm, the AI, the at least one data base and/or the hacking tools.

According to another embodiment, the computer system is configured to receive sensor data from at least one sensor, the sensor data comprising information about at least one of the devices, wherein the at least one sensor is one of optical sensor, an acoustical and/or vibrational sensor, a temperature sensor, an infrared sensor, an electric field and/or magnetic field sensor, a radiation sensor, a mechanical and/or hydrodynamical sensor, an inertial sensor, a positioning or navigation sensor, or an integrated sensor, and wherein the discovery algorithm is configured to use the sensor data for at least one of determining the existence or availability of the at least one of the devices, determining a known type of the at least one of the devices, e.g. for identifying attributes of the device, identifying the capabilities of the at least one of the devices, and collecting basic information regarding the at least one of the devices, e.g. wherein said basic information is used for generating a candidate model for the device.

A second sub-aspect of the second aspect of the invention pertains to a computer-implemented method for identifying by a computer system, for instance by the computer system of the first aspect, capabilities of a group of devices, said group comprising a plurality of electronic devices. The method comprises accessing and observing data streams between a middleware platform and at least a subset of the devices;

identifying, based on the observed data streams, capabilities of the devices of the subset; and storing the identified capabilities in a device catalog listing known devices and capabilities of each listed device.

In some embodiments, the identified capabilities are also stored in a capability catalog listing capabilities available in the group.

According to one embodiment, the method further comprises providing definitions for synthesized capabilities and/or rules for constituting synthesized capabilities, wherein synthesized capabilities are capabilities that can be constituted based on other capabilities, e.g. based on capabilities listed in the capability catalog, and synthesizing synthesized capabilities based on the information from the capability definition catalog and based on capabilities available in the group.

In one embodiment, said capabilities definition catalog further provides definitions of capabilities that are not synthesized capabilities. In another embodiment, the capabilities definition catalog is updated when capabilities are identified that are not yet defined in the capabilities definition catalog.

According to another embodiment, the method further comprises receiving, at the computer system, a task to perform a process, wherein one or more sub-tasks have to be performed as part of the process, and identifying needed capabilities for performing each of the sub-tasks. Identifying capabilities of the devices then comprises determining a presence of the needed capabilities in the devices.

In one embodiment, the method further comprises calculating a workflow for performing said task, the workflow involving one or more devices, capabilities of which have been identified, distributing the sub-tasks to the one or more involved devices, and utilizing the one or more involved devices for performing the task.

In another embodiment, identifying capabilities of a device comprises using artificial intelligence to identify capabilities of the device that are unintended capabilities or not designated capabilities of the device, for instance wherein a presence of at least those unintended or not designated capabilities is determined that have been identified as needed capabilities.

According to another embodiment of the method, the plurality of electronic devices comprises at least one or more first devices or second devices and at least one or more third devices, wherein first devices, e.g. being smart devices comprising self-describing functions configured for disclosing capabilities of the device to the computer system, are configured to grant the computer system access to a data storage of the respective first device, in particular wherein a compatible software agent is installed on the first devices, second devices are equipped with a module that is configured to exchange data with the device and to grant the computer system access to a data storage of the respective second device, e.g. so that the second devices become smart devices, in particular wherein a compatible software agent is installed on the module, and third devices are devices that are neither first devices nor second devices, e.g. not smart devices.

For determining the capabilities of at least one third device, the method comprises an at least partially automatic running capability discovery process, in the course of which a type of at least one third device is determined or deduced using an artificial intelligence having access to a data base.

In one embodiment, in the course of said capability discovery process, hacking tools are used to obtain access to a data storage unit of at least one third device, and a data connection is established between the computer system and the third device, e.g. using said hacking tools. Protocols and/or functions may be installed on the device using the established data connection, and the capabilities of the third device may be identified using the installed protocols and/or functions. Suitable hacking tools optionally may be selected based on a determined or deduced type of device.

According to another embodiment of the method, determining the type of at least one device comprises identifying attributes of the device, and accessing a data base comprising information about attributes of a multitude of known device types. Determining the type may comprise recursively identifying more attributes of the device, if the identified attributes match attributes of more than one known type, and/or using probabilistic evaluation based on the identified attributes, such as correlation.

In one embodiment, said identifying of attributes of the device comprises generating, particularly based on available basic information regarding the device, a candidate model for the device, the candidate model comprising an assumed type and/or assumed functions of the device, and then verifying the assumptions and/or determining a degree of fulfilment of the assumptions. Generating the candidate model may comprise:

considering environment information about the environment of the device, the environment information comprising information about devices that are typically present or to be expected in the environment, considering historical data concerning previous identification of capabilities, and/or using sensor data for collecting basic information regarding the device to base generating the candidate model on the collected basic information.

Verifying the assumptions and/or determining a degree of fulfilment of the assumptions may comprise:

using hacking tools to enter access to a data storage unit of the device, executing commands, based on an assumed type of the device, for activating assumed functions of the device, and monitoring a behaviour of the device in response to each command.

According to another embodiment, the method further comprises establishing a data connection between the computer system and the one or more first devices or second devices, installing protocols and/or functions on the one or more first devices or second devices using the established data connection, and identifying capabilities of the one or more first devices or second devices using the installed protocols and/or functions.

According to another embodiment of the method, at least one sensor provides sensor data to the computer system, the sensor data comprising information about at least one of the devices, e.g. about at least one third device or non-smart device. The at least one sensor is one of an optical sensor, an acoustical sensor, a vibrational sensor, a temperature sensor, an infrared sensor, an electric field sensor, a magnetic field sensor and a radiation sensor, and the sensor data is used for at least one of determining the existence and/or availability of the at least one of the devices, determining a known type of the at least one of the devices, particularly for identifying attributes of the device, identifying the capabilities of the at least one of the devices, and collecting basic information regarding the at least one of the devices, wherein the basic information is used for generating a candidate model for the device.

According to another embodiment of the method, the capabilities comprise at least one of sensing or measuring capabilities, production or processing capabilities, movement, transportation or positioning capabilities, heating or cooling capabilities, lighting or visualizing capabilities, communication capabilities, computation and/or data storage capabilities, electric charging or fueling capabilities, and repairing, maintaining or servicing capabilities.

According to another embodiment of the method, a position of each of the one or more devices is determined in a high-dimensional configuration space, the position being related to location, time, regulations and a state of the device. The position for instance may comprise a geographical location and an affiliation with a certain project within a certain time frame.

A third sub-aspect of the second aspect of the invention pertains to a computer programme product comprising programme code which is stored on a machine-readable medium, or being embodied by an electromagnetic wave comprising a programme code segment, and having computer-executable instructions for performing, in particular when run on a computer system according to the first aspect, the method according to the second aspect.

BRIEF DESCRIPTION OF THE DRAWINGS

The aspects of the invention in the following will be described in detail by referring to exemplary embodiments that are accompanied by figures, in which:

FIG. 18a shows a first embodiment of a multi-agent system that can be used with a system according to the second aspect of the invention;

FIG. 18b shows a second embodiment of a multi-agent system that can be used with a system according to the second aspect of the invention;

FIG. 19a shows a table to illustrate an optimization of the allocation of identified devices to a task;

FIG. 19b shows a table to illustrate an evolving programs approach;

DETAILED DESCRIPTION OF THE INVENTION

Retroreflector Having Rotating Detection Field of View

Figure 1:
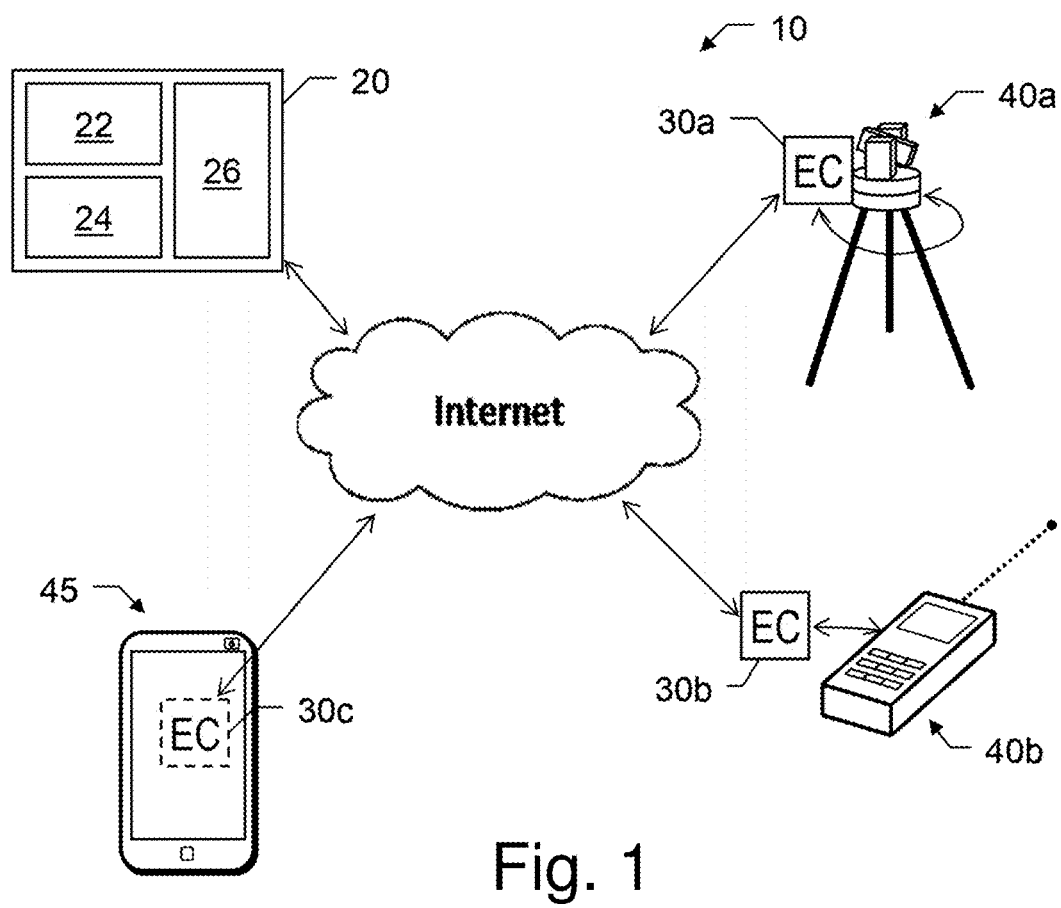
FIG. 1 shows an exemplary embodiment of a local measuring system as a part of a system according to the first aspect of the invention.

FIG. 1 illustrates an exemplary embodiment of a local system 10 that is embodied as a local measuring system and can be connected to and used with a digital services distribution system according to the first aspect of the invention. The shown system 10 comprises a computing device 20 and three software agents 30a-c (EC), wherein two agents are provided in agent modules 30a-b, each of which being connected to surveying devices 40a-b, and one software agent 30c is installed directly on a user device 45, e.g. as a mobile device application ("app").

Although the depicted devices 40a-b in these examples are adapted as surveying devices, the agents can also be provided in or at other kind of devices. These can be actuating devices like machine tools, industrial machines, manufacturing robots or construction machinery. Also other kinds of measuring devices than the depicted ones can be used, e.g. reality capture devices, laser trackers or total stations. Also unmanned aerial or ground vehicles (UAV/UGV) comprising surveying or other measuring equipment can be used, e.g. surveying drones or inspection robots.

The modules 30a-b with the agents installed thereon are connected to external devices 40a-b and adapted to exchange data with the respective connected device. For instance, such a connection might include using a universal serial bus (USB) or other hardware interface or a wireless data connection such as Bluetooth.

In the shown example, the devices comprise a laser scanning device 40a, a hand-held laser distance meter 40b, and a portable electronic device 45 that is assigned to a certain user. For instance, the portable device 45 can be a smartphone or tablet PC or a wearable such as a smart watch. As device 45 is adapted to allow installing external software or deploying a set of microservices, the respective agent 30c can be provided as a software application directly in the external device 45 instead of being provided in a module that is connectable to the device 45. It is also possible to provide the software by app delivery, e.g. by means of a mobile app that can be used for a certain workflow only or for a multitude of different workflows.

The computing device 20 comprises a computing unit 22 having a processor, a memory unit 24 adapted for storing data, and a communication unit 26 (e.g. comprising a modem) allowing data interchange with the agents 30a-c.

Alternatively, the computing device 20 can be embodied by a plurality of devices, with a user device operated by a user and further devices for performing the computing. Also, the application may run in a cloud. The computing device 20 may optionally also be embodied by a cloud or a plurality of devices.

As shown, the computing device 20 can be connected via the Internet with the remote agent modules 30a-b and the portable device 45 comprising the third agent 30c. This is especially useful, if a direct data transfer is not possible because the devices are positioned at a larger distance from each other, e.g. more than a hundred meters away, or if, for instance, a workflow comprises capturing data of a skyscraper with multiple measuring devices positioned in several stories of the building.

Alternatively, the computing device 20 and the agents 30a-c can be grouped locally together and connected with each other, for instance wirelessly, e.g. by means of a wireless local area network (WLAN) or by means of mesh networks such as LoRa (Long Range Wide Area Network) or ZigBee or Bluetooth. Also, some devices or modules may be connected via Internet and others connected locally to the computing device 20. Also, devices or modules can have both local and cloud connections.

The computing device 20 can be a user device such as a personal computer that is operated by a user and comprises input means such as keyboard and mouse for entering or selecting a task to be performed by the devices 40a-b, 45. Alternatively, especially in case of the second embodiment, the computing device 20 can be another portable device (such as the user device 45).

The system may optionally also provide a functionality to orchestrate new functionalities for the devices 40a-c. These new functionalities may comprise e.g. algorithms, fog analytics, control system strategies or safety & security features. This is possible e.g. through a combination of publishing of device information and reflection (="self-description") of the devices' capabilities. The integration of all this information allows the orchestration of algorithms, analytics, etc. with the deployment of new workflows to specific systems. The system can play the role of the orchestrator of many systems with its ability to deploy workflows to other systems. Depending on the situation, one of the agents can also take the role of an orchestrator to manage other agents.

Also virtual devices can be formed that have capabilities of different devices merged. Devices can learn to understand, group and tailor device functionalities. Other devices can be mimicked. For instance, a total station, such as e.g. the Leica Nova MS60, could mimic the functions of a laser scanner, a handheld distance meter or even a plumb.

A multitude of local systems 10 like the one described in FIG. 1 can be connected by a system according to the first aspect of the invention.

In FIGS. 2 and 3a-c exemplary diagrams generated by an exemplary digital services distribution system are shown. In some embodiments, a digital services distribution system according to the first aspect of the invention may be configured, deployed and operated using a Computer Aided System Engineering (CASE) tool, which provides the ability to abstract complexity and system differences into an easily understandable series of diagrams. The FIGS. 2 and 3a-c show examples of such diagrams. Through interoperation of several platforms that are collectively configured, deployed and operated using a common CASE tool, autonomous connected ecosystems (ACE) can be created, i.e. a state where data is connected seamlessly through the convergence of the physical world and its digital realization, with intelligence built-in to all processes from the core system to the edge of the network.

Each diagram provides a view of the same system from a different perspective, some aimed at system experts, some at domain experts, some at management and some at those responsible for operating and maintaining the system. By providing different views of the same system, people from different disciplines can collaborate and agree at the conceptualization, design, implementation and production stages of a project without having to understand each other's disciplines in detail and with the ability to focus on their responsibilities within that system.

The diagrams are organized in a nested hierarchical manner so that users may navigate from contextual levels of detail down to very detailed levels by expanding diagram symbols to reveal the underlying complexity. This allows users to expose the amount of detail that enables them to do their job without being overwhelmed by the entire system in one go. It also allows them to navigate to detailed parts of the system without losing track of their position in the larger context.

Each system may have a context diagram that describes how the underlying subsystems are connected at a logical level. It provides all users with a high-level overview of the system under consideration. When representing a running system, this diagram shows the current operational state of the whole system.

When considering the system in terms of deployed software and hardware, a deployment diagram is used. This diagram shows where software is deployed, the modules the software is made from and the distribution of those modules between devices. It also shows connections between systems where those connections are relevant to the deployed system. When deploying a system, this diagram shows the current state of deployment including versions, module use, successful and unsuccessful installations and failure conditions. This enables monitoring and remediation during deployment and upgrade activities for both the entire system and parts of subsystems depending on the activity currently being undertaken.

Figure 2:
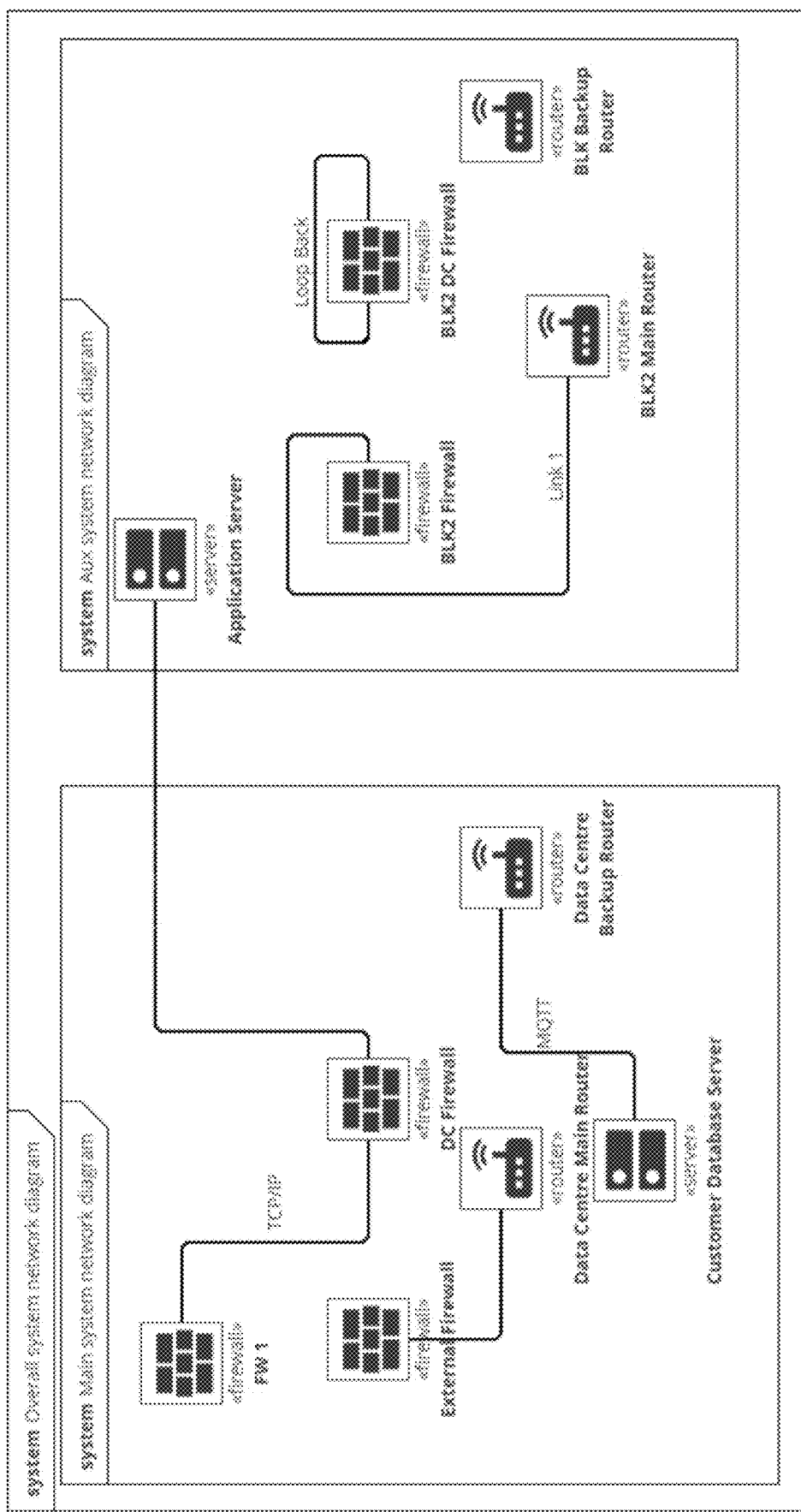
FIG. 2 shows a network diagram of an exemplary system to be presented to user of the system.

FIG. 2 is a network diagram showing an exemplary system in terms of connectivity, the physical hardware and its location. It also shows devices that are present in the system but are only of interest from a communications and network security perspective. During operation and deployment, this diagram shows the network and hardware state in real time.

Figure 3A:
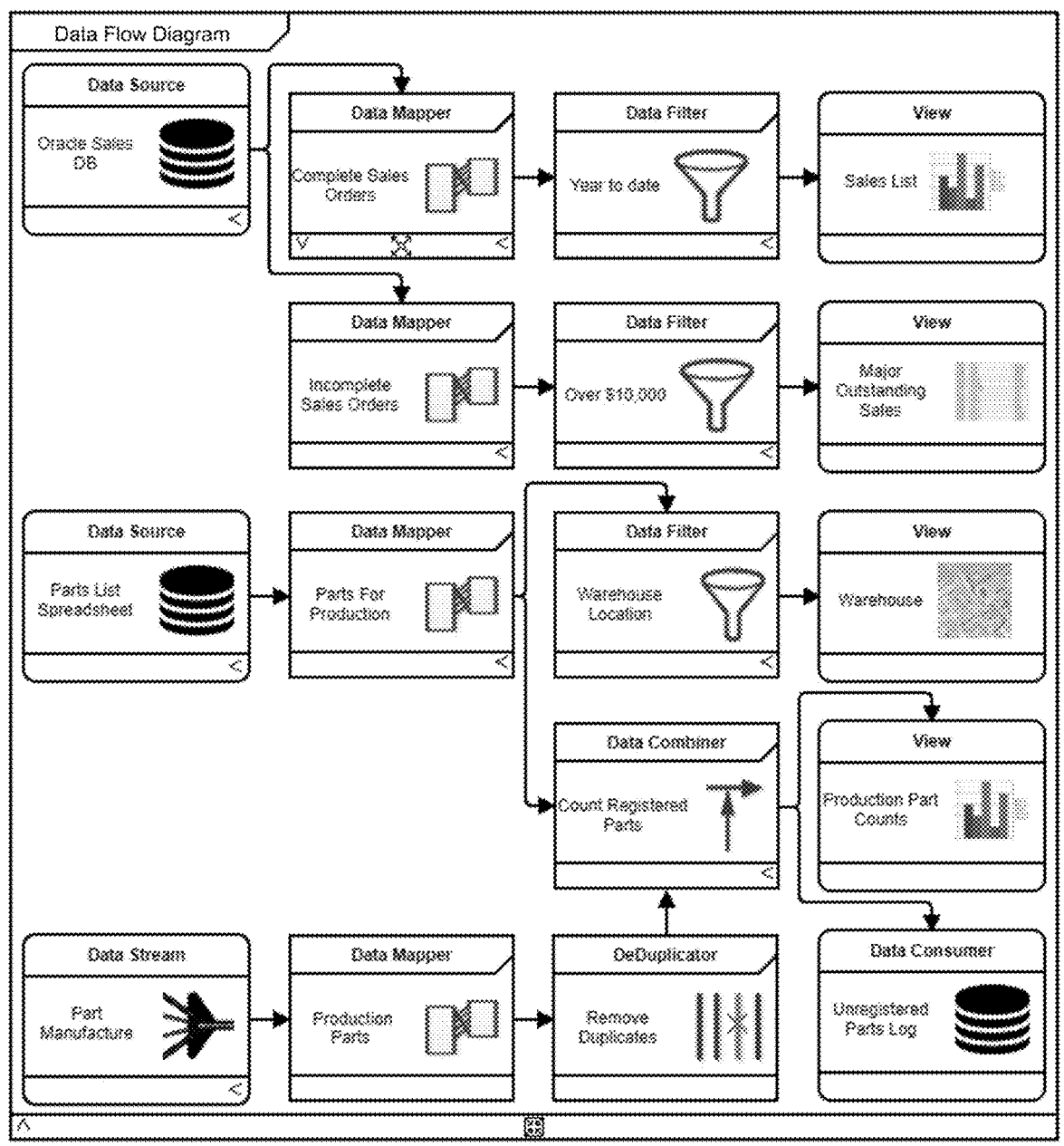
FIGS. 3a-c show a data flow diagram of an exemplary system to be presented to user of the system.
Figure 3B:
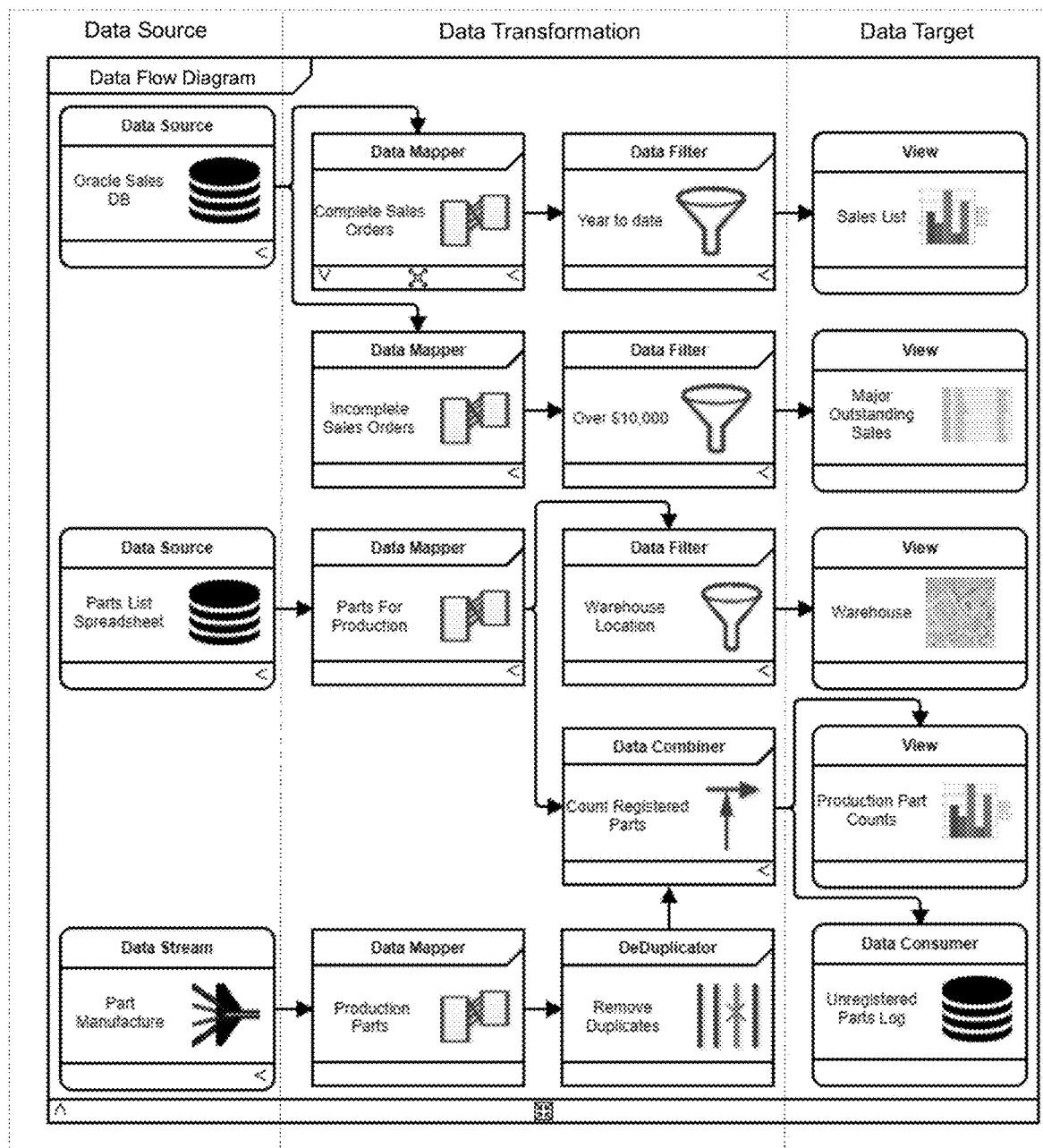
Figure 3C:
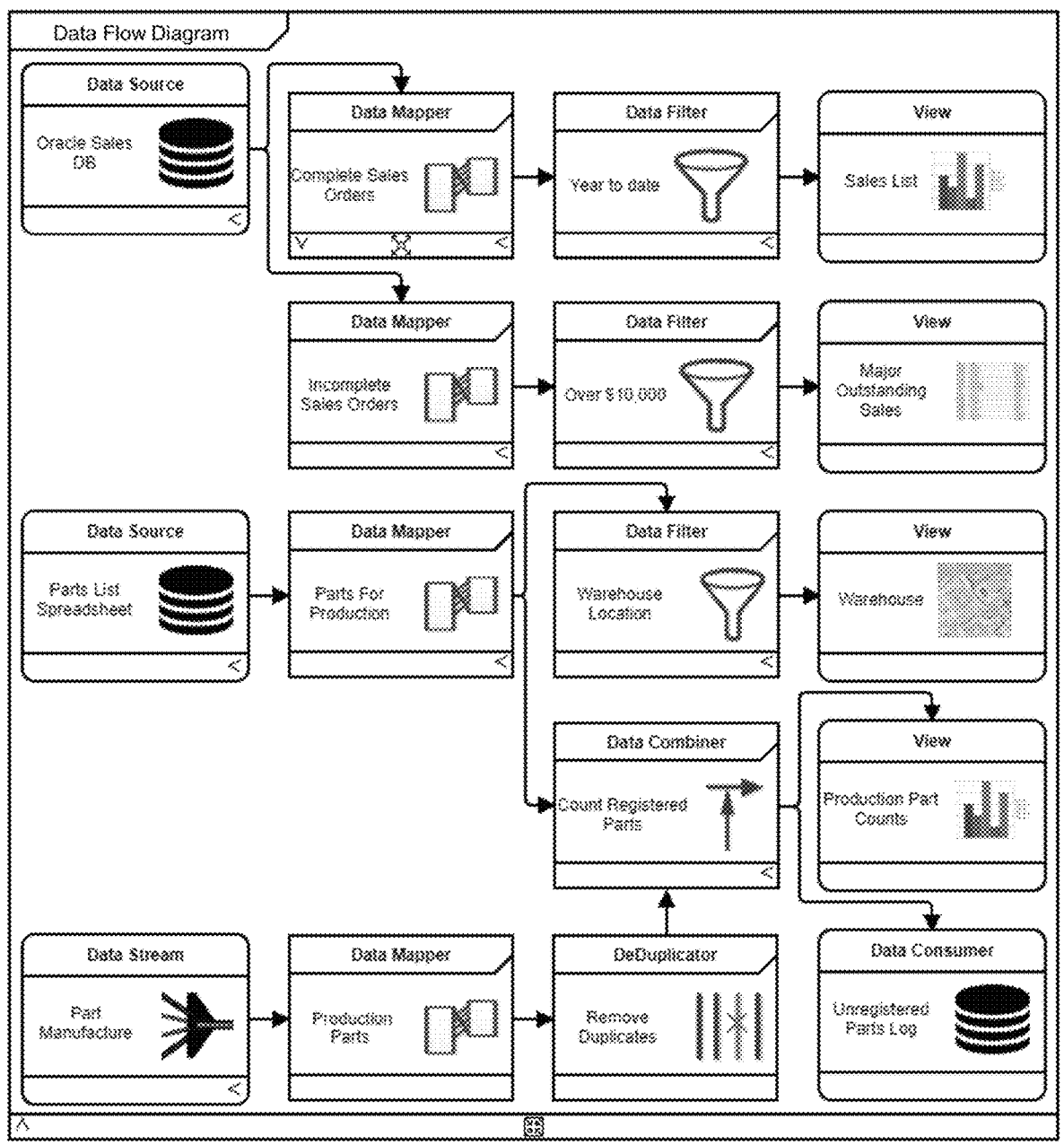

FIGS. 3a-c show a data flow diagram of an exemplary system. The data flow diagram of FIG. 3a is used by people with domain or business expertise, i.e. the people who will gain value from the system and understand the functionality required without necessarily understanding the underlying technology or connectivity. It represents the system as a series of data end-points and transformations, showing the movement, combination, separation and enrichment of data between two or more points in the system. These could be a back-end big-data source, a real-time edge data stream, a shared file store, a user application screen, a dashboard, an archive repository, a log file, or other data source or data target. The complexities of accessing the data or transforming it are hidden from the user and presented in the same form regardless of the actual technology, structure or method of implementation.

When representing a running system, actual data flows and transformations can be monitored as they happen. This is useful during development, testing and production in that it exposes the hitherto inaccessible flow of data in real-time. This would previously be deduced by the very arduous task of creating specific source test data and then looking at the resultant target data with log files being used to find data, timing and misconfiguration errors along the way. This process is completely automated in the system with the data flows being extracted from the data source, log files and data target in a transparent manner, which is then presented on the same data flow diagrams. This facility enables extremely fast and efficient development, testing and monitoring of systems and allows for a much more agile approach to system integration and interoperability.

As can be seen in the example of FIG. 3a, a data mapper and filter is used on three completely different data sources, two different data sources are combined to form one combined view and valid data is separated from erroneous data. All data targets are treated in the same manner whether they are mobile App views, BI dashboards or database/log files, i.e. the underlying complexity has been obscured into a common set of operations understood by the user. The filter may be a collection of processes and functions that output a subset of data or a derived set of data based on provided inputs.

The data flow diagram of FIG. 3b has been annotated to identify the data source, transformation and target components, and the data flow diagram of FIG. 3c has been annotated to show the underlying sub-systems (Mobile/Cloud, Enterprise Integration, and Edge Computing). These underlying details are unnecessary for the target user and are shown here as an example of the simplification process used in the exemplary system of FIG. 3a to allow different user groups to configure systems while focusing on their area of expertise.

The system's configuration and operation is managed at many different user levels, both in expertise and operational focus. To support this, each diagram, the underlying data and the system capabilities are rigorously and securely managed at a fine granularity for each user and user group. For example, a dashboard user may be able to view various pre-configured dashboards, but will not be able to configure new ones, similarly, a user from one organisation will not be able to view the data or configuration of another organisation.

In read-only mode, the user is able to see the configured systems that are accessible by them and look at the configuration and operation of the underlying system. This allows for collaboration, agreement, monitoring and debugging of a system at all stages of development and operation. It does not allow for the direct modification of the underlying system, its configuration or its operational state.

An edit mode is used to create, operate and maintain systems and subsystems. A user's security and access privilege level determines the availability of edit facilities, which underlying subsystems are available for edit and in what manner.

A deployment mode allows for the deployment, installation, setup, configuration and maintenance of the running sub-systems. Deployment in this sense is everything from remotely installing an operating system, to installing and configuring applications and data, managing data migrations, to monitoring the successful deployment and managing the deployed versions of software throughout the system. The deployment mechanism enforces system idempotency i.e. each configured system remains in a known, consistent state regardless of the number of times and order that the various dependencies are installed or configured.

In addition to managing the technical deployment and configuration of software, the system can be used to enforce data, IP and tax governance within organisations and geographies. Enforcing, reporting and monitoring both legal and company policies in this regard. The system "knows" where software elements are deployed, how and by whom they are used and what data is moved between each of them. The system can therefore ensure that no data policies relating to the transmission and retention of data are violated, that data usage is recorded and that transmission limits are applied appropriately. The system can also ensure that IP rules and licenses are applied correctly and that the distribution of IP can be monitored for the application of international tax rules. This mechanism can also be used for the identification and distribution of funds, where multiple business units pay for or supply the system as a service.

Once deployed, and in particular during initial or subsequent deployments, system monitoring is vital for the early identification of unforeseen problems related to machine, process, data loads and patterns. This is particularly important when multiple different types of systems are integrated as these systems may be exposed to patterns, loads and frequencies of data that are outside their normal operating conditions. Being able to monitor bottlenecks, heavy loads, and general anomalies allows for the identification of usage patterns and the early remedial action. This rollout experience leads to trouble free adoption and ready acceptance of a new and updated systems by end users.

During the development and operation of a complex system, it is imperative to be able to test scenarios and monitor usage. Being able to observe changes as they happen and see the effect of those changes throughout the system is key to this. Above and beyond the monitoring capability, the system has the ability to "slow" the passage of data through the system, to control its progress between the various stages of transformation and to alter the actions performed based on that data at each stage of the flow. This greatly improves the speed with which a new facility can be implemented and significantly reduces the time needed to find and fix problems as they arise.

One of the key tenants is to unify and liberate siloed software and systems for broader adoption, to enable the safe introduction of new technologies into trusted systems and to provide a platform that is open to software and systems of several different suppliers. All this while meeting the needs of all the interested parties from Development, IT, Support and Maintenance. This is achieved by sharing previous implementation details and best practice in the form of libraries and diagram snippets. These form a collective resource that can be utilized through cut and paste between diagrams to implement new systems based on previous experience and expertise. A common library that is used as a repository of tried and tested system integration patterns and components by all users of the system.

As each subsystem of the system presents itself in a common format to the user, there is a certain amount of orchestration that goes on below-the-surface to map this common paradigm to the underlying data flows and models of that subsystem. This, and the common presentation (diagrams) is the responsibility of a "toolbox" subsystem. This toolbox consists of the functions and mechanisms to map between the CASE tool and the subsystem and a series of pictorial representations to present that data in a common format. Each toolbox is owned by the subsystem development group so that subsystem changes and improvements remain synchronised with the tool. Each toolbox is plugged into the CASE tool to allow for configuration of that subsystem and inclusion and cooperation with the other subsystems. There is a special system tool box that understands the relationships between subsystems that are beyond the scope of any one subsystem. The system toolbox is maintained by the CASE tool development group along with the interface definitions for the other toolboxes. New toolboxes can be added to the CASE tool, thereby integrating new functionality and allowing the easy adoption of new functionality across all user groups and systems.

Figure 4:
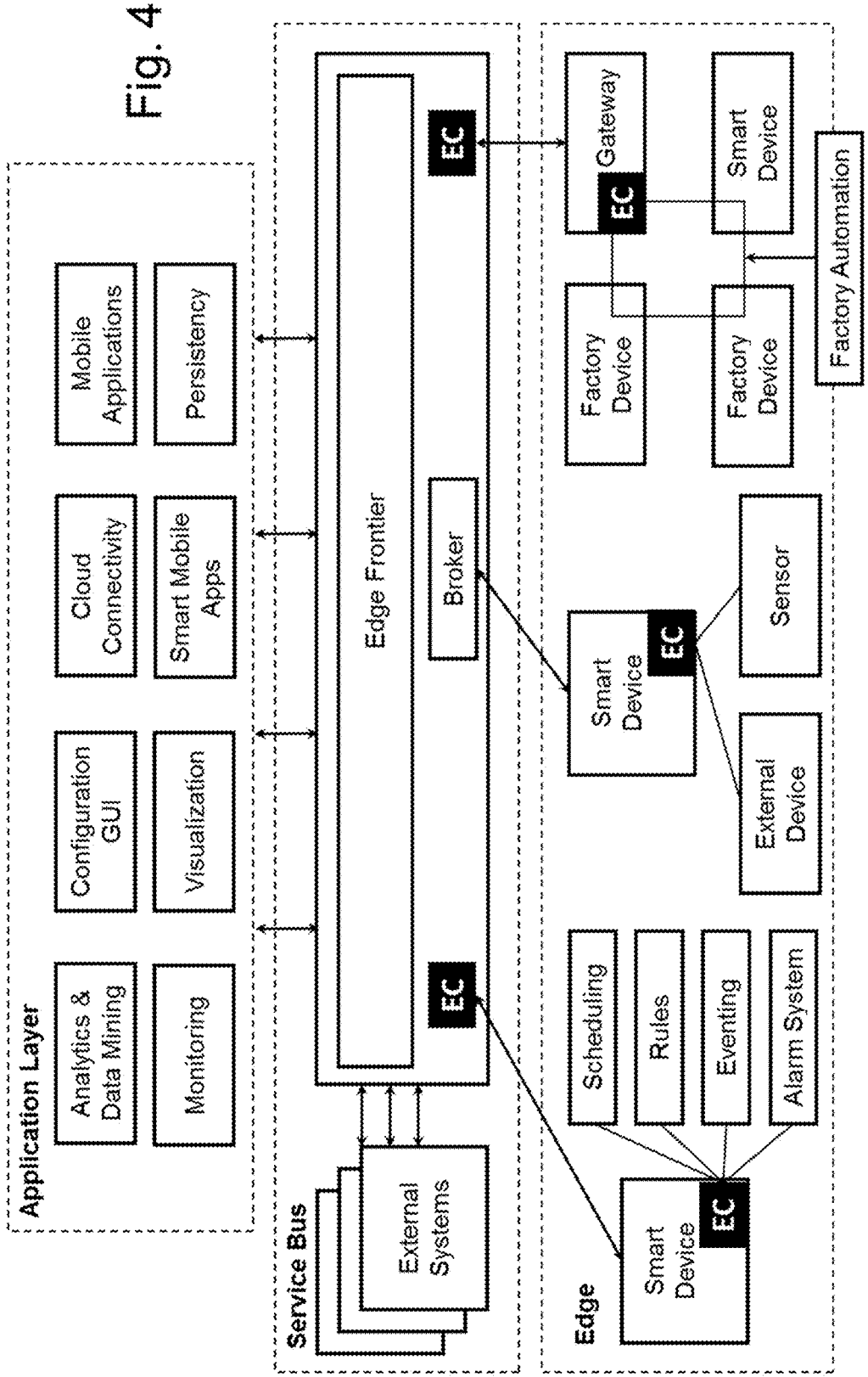
FIG. 4 shows a first exemplary embodiment of a system according to the invention, illustrating data flow between multiple layers and local systems.

FIG. 4 illustrates data flow between multiple layers and local systems in an exemplary Digital Services Distribution System. An enterprise service bus implements a communication system between mutually interacting software applications in a service-oriented architecture. As it implements a distributed computing architecture, it implements a special variant of the more general client-server model, wherein, in general, any application using the service bus can behave as server or client in turns. The service bus promotes agility and flexibility with regard to high-level protocol communication between applications. The primary goal of the high-level protocol communication is enterprise application integration of heterogeneous and complex service or application landscapes. In the illustrated system, the service bus is run using "Edge Frontier" (EF) technology, connecting with a multitude of local systems at the "Edge". The term "edge" refers to the geographic distribution of computing nodes in the network, e.g. as Internet of Things (IoT) devices. In this example, each of the local systems comprises at least one device that is equipped with an "Edge Client" (EC) software agent (described above with respect to FIG. 1), providing data transfer with the EF service bus.

For distributed digital services like smart convergence platforms or smart/modular analytics, the legal situation may become more complex in view of privacy and data protection. In this context, the localisation of services becomes important issue. Due to the globally distributed services, e.g. by moving processes to the cloud which in turn means delocalisation, a plurality of jurisdictions might be potentially affected and various legal provisions may apply. For example, by using "EdgeClient" (EC) and "EdgeFrontier" (EF) as shown in FIG. 4, data may be generated in a certain jurisdiction and subsequently transferred to another jurisdiction where data processing is performed and new data and information are generated. In turn, data and information will be sent back to the EC where the process originated. Furthermore, the particular EC may be provided with specific functions and capabilities via EF. The flow of data and software modules or libraries may occur across national borders and may be difficult to follow or even control.

However, in view of legal implications, a localization appears to be necessary or compulsory if applicable law has to be determined, e.g. in case of infringement of third parties' rights. This similarly affects many industries and fields of technology. Consequently, not only providers of internet based services but also conventional industry need to deal with these challenges. Similar considerations may be relevant for manufacturing intelligence with integration of measuring directly into the manufacturing lines. The data generated by sensors is stored, processed, analysed and the derived results or aggregates transmitted back to the initial customer or to other users. The structure may also use several layers of data handling which will be locally separated and which may also be located in different jurisdictions.

Figure 5:
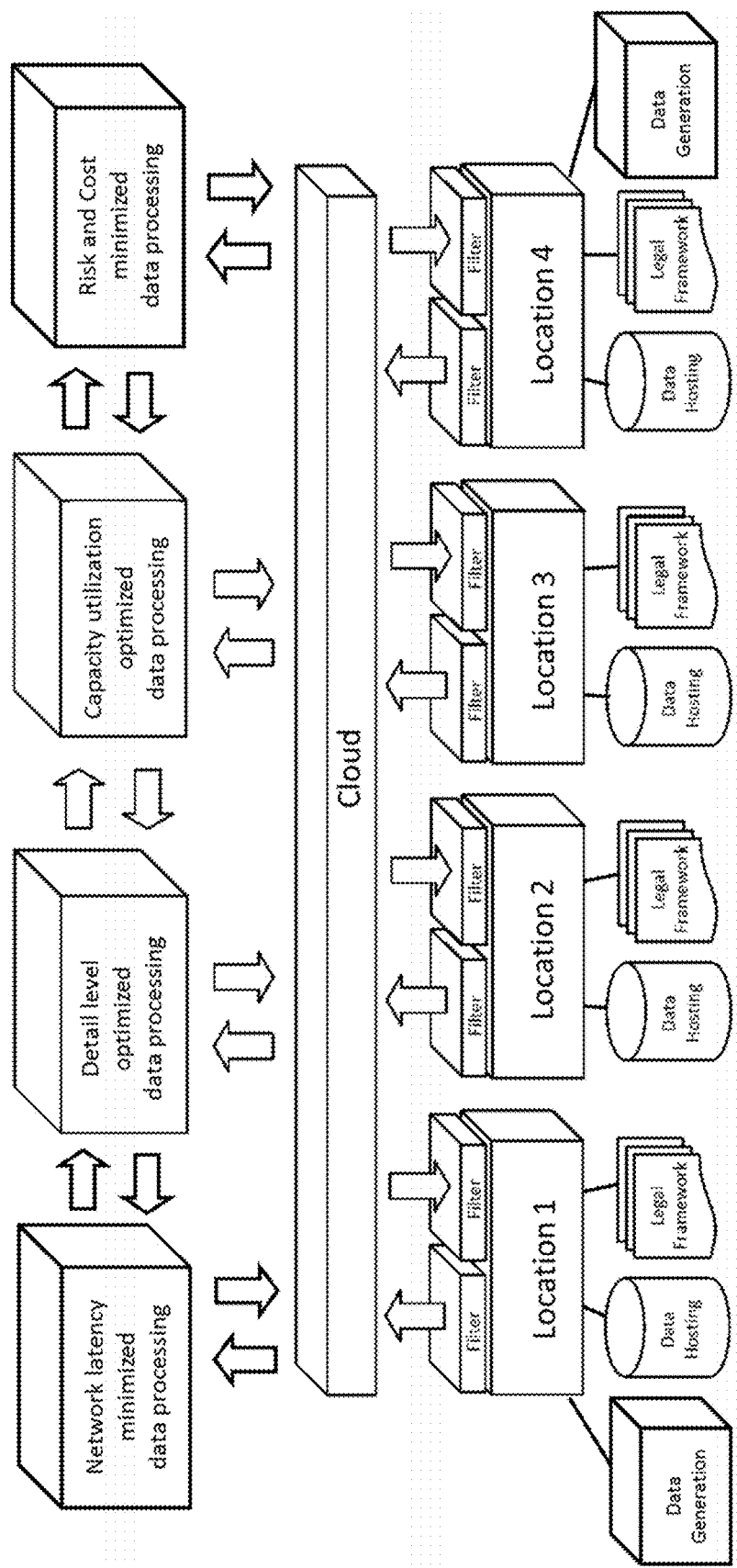
FIG. 5 shows a second exemplary embodiment of a system according to the invention, illustrating general elements of an approach for structuring distributed digital services according to the invention.

FIG. 5 illustrates an exemplary system with delocalized data storage and processing. A local element and a delocalized, cloud based element are used. The critical decision is how to select data and functions which are stored or provided locally and which are moved to another layer for being stored and processed elsewhere.

In general, such layered and delocalized structures may lead to distributed services which can cover far more jurisdictions than conventional software solutions which are executed more or less in a single or at least a very limited number of jurisdictions. For providers of distributed digital services, the legal implications might become even more important in the future.

On the one hand, technical reasons which may lead to a certain localization of data processing have to be considered, for instance on-board processing or local hosting to decrease response times, which is important e.g. for autonomous driving. The available capacity at each hosting location and its optimal utilization is a key factor. A necessary detail level of processing or an importance to provide data processed at a certain detail level have to be considered. The question of where to process data can already be subject to an optimization that is purely based on these questions. However, it is not possible to base the consideration purely on these questions, if several different jurisdictions are involved.

Then, aside from the purely technical reasons, also legal implications issues need to be considered, such as minimization of legal exposure and risk and maximization of return by reducing cost, particularly tax. For distributed digital services at least the following legal implications or considerations are relevant:
 ownership of data (e.g. database protection, contractual issues, unfair competition),
 restrictions of use (e.g. data protection and privacy),
 export/import restrictions,
 data protection standards,
 technology export,
 sanctions,
 liability issues and
 taxation issues.

Once data are generated or collected, it remains an issue whether or to what extent these data can be used by the owner of the generating or collecting system (e.g. a local measuring system of FIG. 1) within the jurisdiction of origin or in other jurisdictions.

Many restrictions may apply. For instance, regarding the ownership of the collected or generated, this is currently discussed in a wider context, e.g. in view of a future harmonized property law within the EU. Nevertheless, current restrictions to using data based on ownership in the widest sense can be based on several mechanisms, e.g. contractual regulations, unfair competition or database protection.

For a data collector it is important to ensure that generated data are collected in a controlled manner which creates database rights for specified entities. Otherwise, use of data owned by other parties would have to be considered in a contractual framework. Moreover, data protection and privacy standards limit the use of data as long as the data could be linked to a particular person. Whereas these two points would also be relevant for a use of data within a particular jurisdiction, further restrictions may apply with view to export of data or corresponding information. Again, this could be caused by data protection or privacy provisions but also by technology export limitations or embargos.

Providing goods and services generally implies warranty and liability issues. However, for distributed digital services further more specific risks may emerge, e.g. if in the course of data processing a jurisdiction would be involved unintentionally, so that third parties' rights in this jurisdiction are violated.

Another issue is ex delicto liability which may occur even without intention or knowledge. Particularly in the field of intellectual property and computer-implemented inventions, it may happen that a distributed process may create an effect in a jurisdiction with patent protection for the technology used. Therefore, the setup of data processing infrastructure and the assignment of processes to particular countries have to be considered under potential ex delicto liability, e.g. it has to be considered whether third parties' rights could be violated.

Also the taxation of internet based services is an important issue. If general principles are followed, taxation should reflect place and amount of value created. However, in the current environment, for many international corporations, taxation only arises if the corresponding business has a physical presence in a particular jurisdiction. However, one feature of distributed digital services is that they can be provided with minimal physical presence right from the start, even in the country of residence. It is for that reason that cross-border activities of digitalised businesses are seen as falling into the gaps of international tax rules and remaining untaxed in most jurisdictions where the business is digitally present and creating value. A physical localization of data processing and corresponding value creation may have tax implications. Without proper assignment of services to a particular jurisdiction the risk of multiple taxation may increase, potentially preventing a break-even when offering these services service.

It is suggested that the above mentioned developments and conditions have some impact on the design of how to provide digital products and services. Whereas the conventional distributions of hard- and software products may be less affected, the field of distributed digital services is particularly critical.

Preferably, all data generation, collection and hosting for a local customer should be kept within a single jurisdiction to avoid legal or taxation pitfalls. The technical setup is accompanied by a framework of legal documents specifically addressing all local provisions and minimizing risk to the extent possible under the particular jurisdiction.

In order to satisfy restrictions on data/technology import and export, outbound and inbound filters are implemented for each environment. By using suitable filters, it is possible to enable a free flow of data and information in a neutral sphere where the allocation of processing could be organized also according to risk minimization and tax optimization considerations.

FIG. 5 illustrates general elements of such approach for structuring distributed digital services. At four locations with different legal frameworks data is hosted. At some of these locations data is also generated or otherwise collected, e.g. generated by means of a local measuring systems as shown in FIG. 1. The data may be stored and processed either at the same location, at one or more other locations or both. This decision can be subject to an optimization for each set of data. The optimization may take into consideration a minimization of network latency, an optimization of a required detail level, an overall optimization of the utilization of the data processing and storage capacities and also a minimization of legal risk and also effects of taxation. Filters are installed at each location that decide based on legal frameworks whether a certain set of data may or may not be transferred from the location to a certain other location or vice versa. Such bi-directional filters using in- and outbound filtering functionality allow enabling location-dependent access to data and algorithms In many constellations, in- and outbound filters will be required. However, there may be technologies and jurisdictions which allow implementation with only one direction of filtering.

As the technically best location for processing a certain set of data may be excluded by legal or contractual regulations for this very set of data, the filter settings have to be considered within the optimization. If more than one location is allowable in view of the legal framework and equally (or similarly) suitable for processing the data, the question of taxation can be considered in order to avoid multiple taxation.

In many cases it is possible to adapt the data sets in view of the legal framework to allow transfer. This adapting of the data may comprise applying an abstraction level to the data, i.e. deleting certain information, e.g. by means of anonymizing personal data, through format preserving cryptography, or by censoring critical information. Depending on the structure, content and origin of a certain data set, a number of possible abstraction levels may be available. Also, the system may be configured to perform the abstraction automatically or give instructions for a user which information needs to be deleted to create an abstracted version of a set of data at a certain abstraction level. The available abstracted versions of a data set have to be considered within the optimization. For instance, if personal data in a data set would need to be deleted for processing the data set abroad, the optimization might need to determine whether processing the data set with the personal data would be crucial, desirable or expendable.

Figure 6:
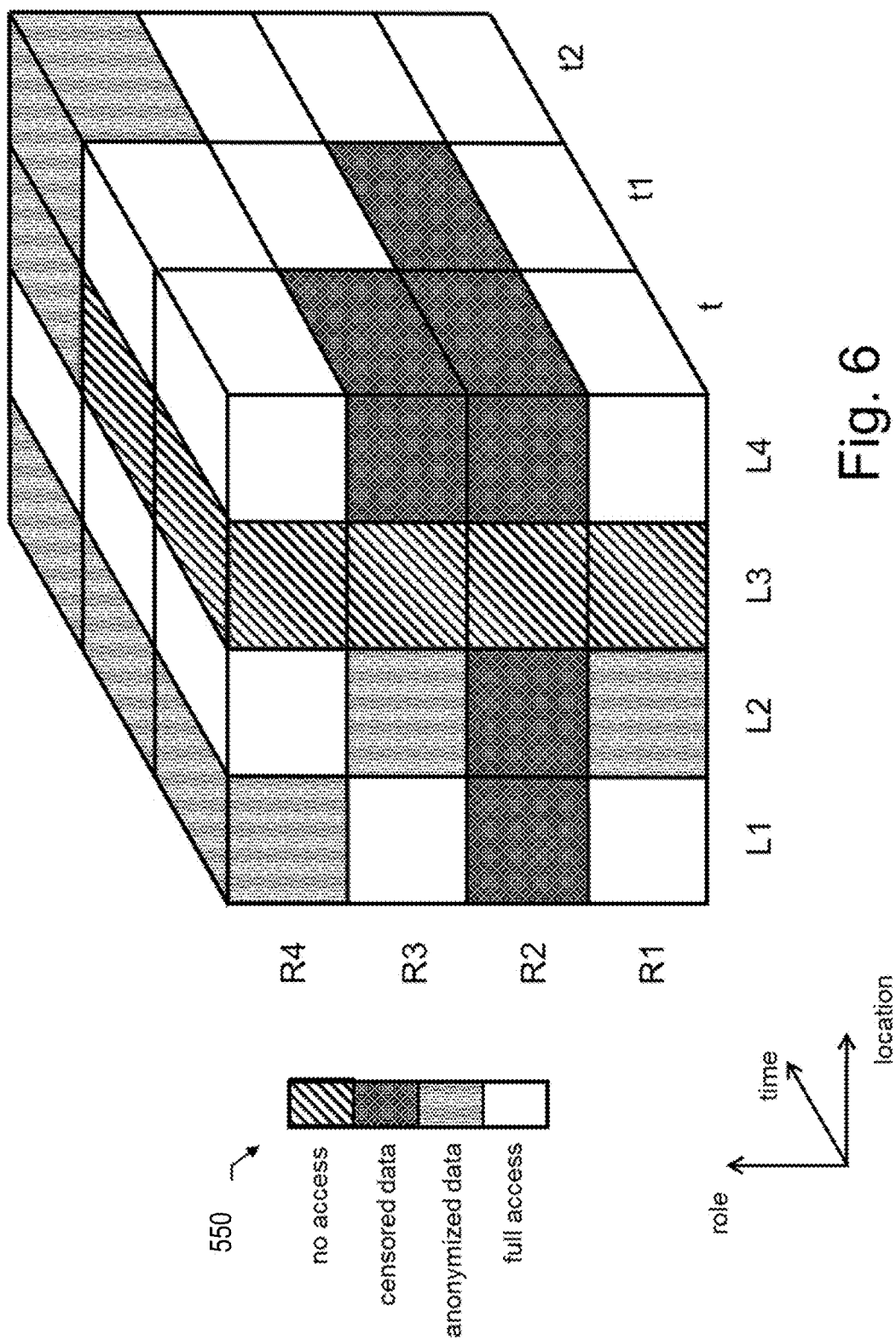
FIG. 6 illustrate filter settings of an exemplary filter of the system.

FIG. 6 illustrates filter settings 550 by means of a 3D matrix. In the given example, an outbound filter has four different filter settings 30 for allowing data at certain abstraction levels to be accessed by certain user roles (R1-R4) at certain locations (L1-L4) at a certain point of time (t, t1, t2). The filter settings include "full access", i.e. no abstraction being applied, and the two abstraction levels "anonymized data" and "censored data" where certain kinds of data are deleted from the provided data set. For instance, in "anonymized data" all personal data might be deleted, and in "censored data", e.g. additionally, certain critical information such as values concerning trade secrets or critical technology might be deleted.

The fourth filter setting "no access" means that the data itself cannot be accessed by that user at that location and time. However, information may be provided that certain data exists, why it cannot be accessed and when or by whom it can be accessed.

Whereas t might refer to the present, t1 and t2 refer to points or periods in the future. For instance, after a patent application for a certain measuring method will have been published at point t2, its disclosure will no longer be a trade secret so that it is no longer necessary to censor data sets generated by said method for user group R2.

L3 in this example might be a location in a different jurisdiction on which a ban for technology transfer has been imposed. Thus, at present, none of the user groups R1, R2, R3 and R4 at that location has access to the data set. It is already known that said ban expires at point t2. So after that date, anonymized data can be accessed from L3. Another example pertains to contractual non-disclosure agreements that apply for a certain period of time or until a fixed date.

Of course, the used matrix can also have more than three dimensions. Optionally, the matrix or another visualization of the data comprised by the matrix may be provided to a requester of a set of data for information purposes, in particular if access to the data has been denied or restricted to an abstracted version. A similar matrix might also be used for a data management of the system.

Figure 7:
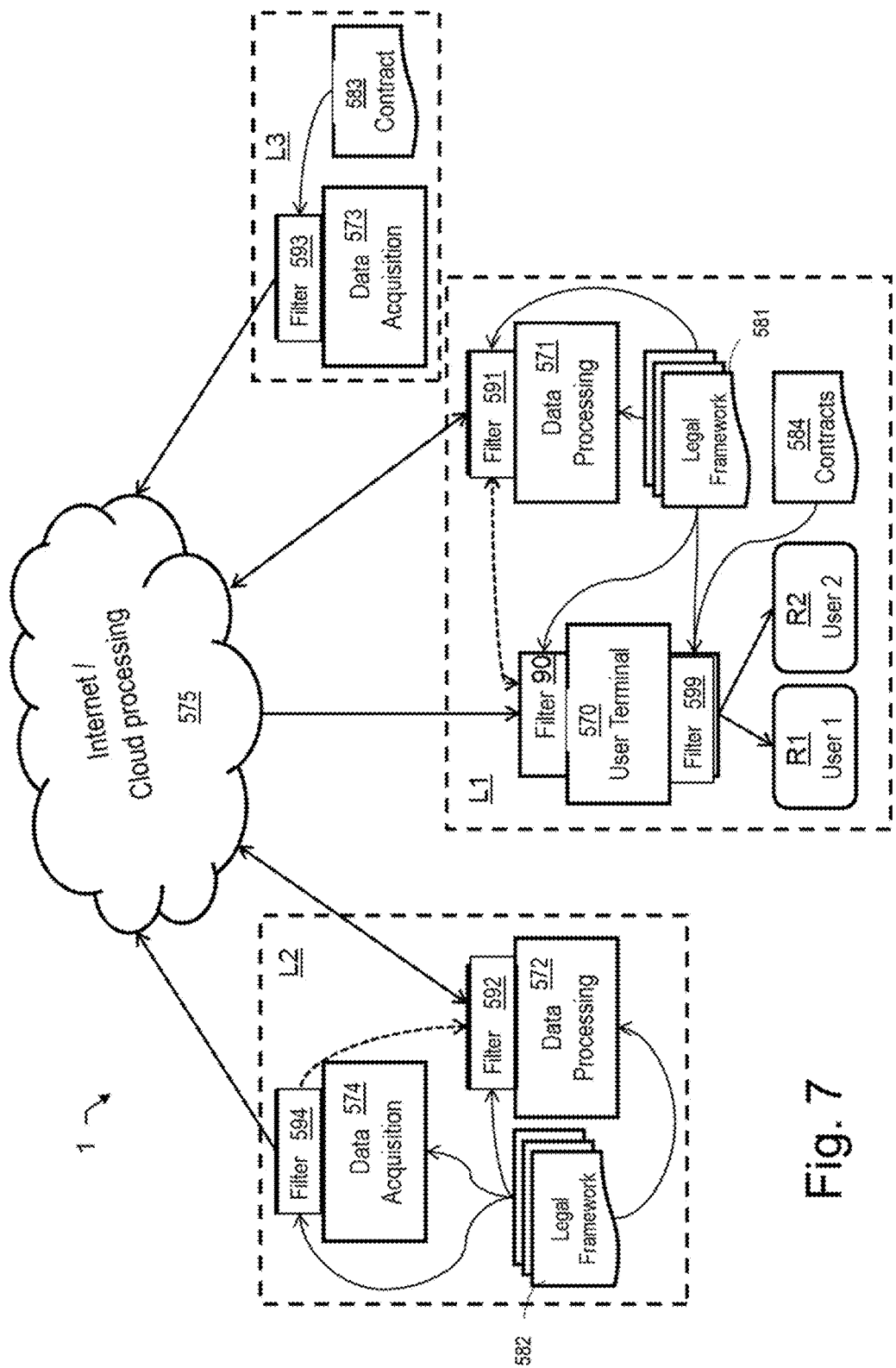
FIG. 7 shows a third exemplary embodiment of a system according to the first aspect of the invention, illustrating options for a decision where to process raw data in order to provide the processed data to a user.

FIG. 7 shows an exemplary embodiment of a system 1 according to the first aspect of the invention, illustrating controlling the access of data. A user terminal 570 is situated at a first location L1, at which users having different roles R1, R2 can access data that has been acquired and/or processed remotely. Data is acquired at data acquisition units 573, 574 that are situated at a second location L2 and a third location L3. Data, including the data acquired at data acquisition units 573 and 574, can be processed at the data processing units 571, 572 situated at the first location L1 and the second location L2, or delocalized by means of cloud processing 575. All locations L1, L2 and L3 are in different jurisdictions (e.g. in different countries).

The user terminal 570 and the data processing and acquisition units 571-574 are connected with each other by means of a data connection, e.g. by the Internet and/or by the Service Bus of FIG. 4, optionally comprising software agents (EC) as described in FIG. 1 or FIG. 4.

Filters 590, 591, 592, 593, 594 are assigned to the user terminal 570 and to each data processing and acquisition unit 571, 572, 573, 574 to control data traffic via the data connection. The user terminal 570 may further comprise an internal filter 99 to control data access for users according to their role R1, R2. Each filter has individual settings according to legal frameworks 581, 582 at the respective jurisdiction and according to contracts 583, 584 applying to the respective data.

For instance, a first user having a first role R1 wants to compare data acquired by the first and second data acquisition units 573, 574, wherefore data from both units needs to be processed. The data may be that of two production sites producing the same product for different countries, and the user's role R1 may be that of a quality assurance manager. The raw data acquired at the production sites by the data acquisition units 573, 574 may comprise measurement data of produced parts, statistical data concerning a production situation and personal information, e.g. concerning employees involved in the production of a part.

At location L3, a contract 583 with a contractor prohibits some of the generated data to leave the facility and further limits access of measured values to a defined number of users. Upon the request of the user at location L1, the filter 593 will therefore allow access only to a version of the data set that has a first abstraction level. This version may then be uploaded to the Internet for processing elsewhere, as there is no processing unit at L3.

At location L2, the legal framework 582 prohibits exporting unprocessed data comprising personal information. Also, there are specific regulations regarding data acquisition and processing that differ from regulations elsewhere, i.e. from the legal framework 581 at location L1.

Thus, it has to be considered whether it is preferable to process the data of the data acquisition unit 574 at the data processing unit 572 of L2 or to export the data with a second abstraction level. Also, it has to be considered where to process the data of the data acquisition unit 573.

The internal filter 599 of the user terminal 570 may prevent certain data to be provided to a user of the terminal based on the user's role R1, R2. The internal filter 599 has filter settings that consider a legal framework 581 at the location L1 of the terminal 570 and contracts 584 that apply to the provided data. For instance, such a contract might be a non-disclosure agreement that restricts full access to some data to users having a first role R1 and allows users having a second role R2 to access only an abstracted version with certain information being deleted. This abstracted version may be generated directly at the user terminal 570.

The system may comprise a decision engine, e g running on the user terminal 570 or in the cloud 575, wherein the engine is configured to execute an optimization of the processing of the data. The optimization comprises a selection at which processing unit 572, 573 (or cloud 575) the data is processed. The optimization may be based on an actual or forecasted amount of data to be processed. It takes all the filter settings of the filters 590-594 into consideration and further considers a necessary or desirable processing speed, a network latency, a necessary or desirable detail level of the processed data and the available processing capacities.

Depending on the requirements of the user, or his or her role R1, R2, i.e. what data needs to be presented and may be presented, the decision engine determines, based on all filter settings, where the data from the two data acquisition units 573, 574 can be processed. The resulting options are considered in an optimization process, in which a number of technical instances are weighted for all of the possible options. If there are limitations for an option that are acceptable but not desirable, these limitations are also considered in the weighting.

A result of the weighting might then, for instance, lead to the decision to have all data be processed at the data processing unit 572 at the second location L2, wherein the raw data from the second data acquisition unit 574 is transferred directly to said data processing unit 572 (dashed arrow) to avoid abstraction of the raw data that would become necessary if the raw data would be transferred via the Internet using servers outside location L2.

A filter 590-594 may be part of a computer that is assigned to a data acquisition device 573, 574 or to a data processing unit 571, 572. The computer and the assigned device can be part of the same local system, which may be configured as the system shown in FIG. 1. The filter on the computer has a filter setting for restricting and prohibiting data transfer between the computer or its assigned device and other devices or local systems. The filter setting is defined based on the legal framework 581, 582 applicable at the computer's location and configured to restrict or completely prohibit outbound transfer of data. In some cases, this may allow the viewing and modification of data, but not of a local storage.

The computer may be further configured to generate one or more abstracted versions of a set of raw or processed digital data generated by the assigned device or even other devices at the same location or other locations (e.g. if these devices are not assigned to a computer of their own). Generating an abstracted version generally comprises prohibiting, based on the filter setting, access to critical information that was included in the set of raw or processed digital data. This may comprise deleting or encrypting the critical data or aggregating the critical data.

When the computer receives a request to transfer a first set of digital data to a second local system, for instance a request from the decision engine, the computer provides depending on the filter setting, either the first set of digital data or, if the filter settings would prevent this, an abstracted version thereof to the second local system. The computer may be adapted to automatically generate the abstracted versions according to the legal framework if a set of data is generated. Alternatively, the computer may be adapted to generate the abstracted version only when necessary, i.e. upon receiving a request to transfer data, and after the filter determines that only the abstracted version can be transferred. In particular, this computer can be adapted as the computing device 20 of FIG. 1, having a computing unit, a memory unit and a first communication unit, communicating with one or more electronic apparatuses that are configured as data acquisition devices or data processing units via the software modules.

Figure 8:
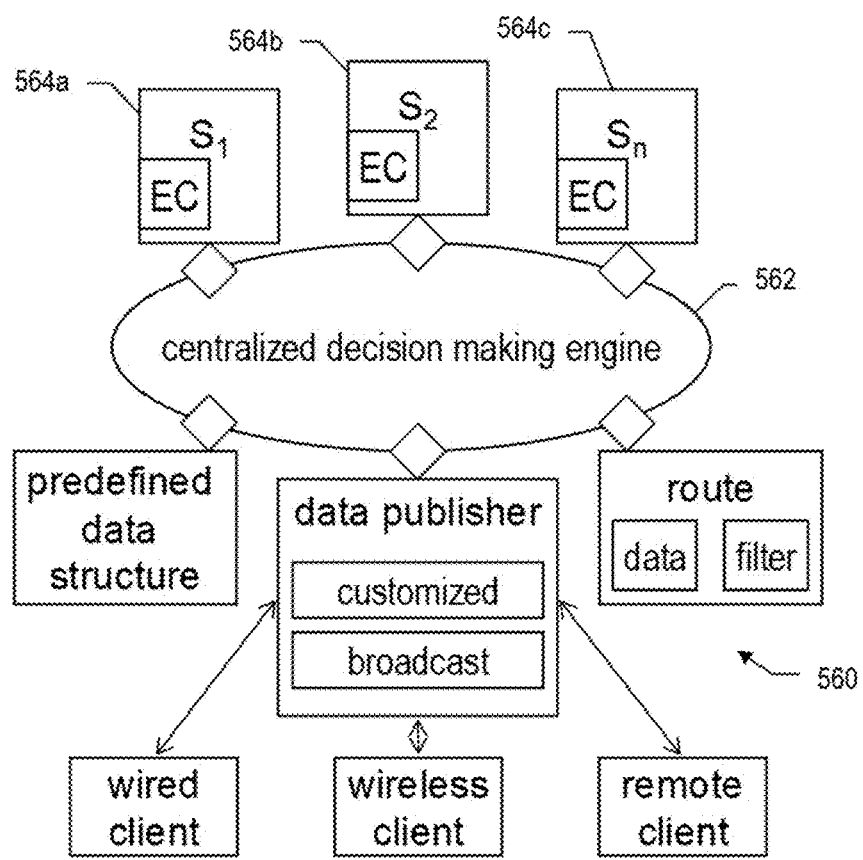
FIG. 8 illustrates an intelligent information platform used together with a system according to the first aspect of the invention.

FIG. 8 illustrates an intelligent information platform that can be used together with a system according to the first aspect of the invention and in some embodiments forms a part of the system according to the first aspect of the invention. In general, such a platform is described e.g. in the document EP 3 156 898 A1. The intelligent information platform provides a fully configurable distributed ERP-like (ERP=enterprise resource plan) information processing platform 560 that routes the information, based on certain rules and policies to a centralized decision engine 562.

Although the first aspect of the invention is illustrated above, partly with reference to some preferred embodiments, it must be understood that numerous modifications and combinations of different features of the embodiments can be made. All of these modifications lie within the scope of the appended claims.

Automatic Identification and Synthesizing of Capabilities

Figure 9:
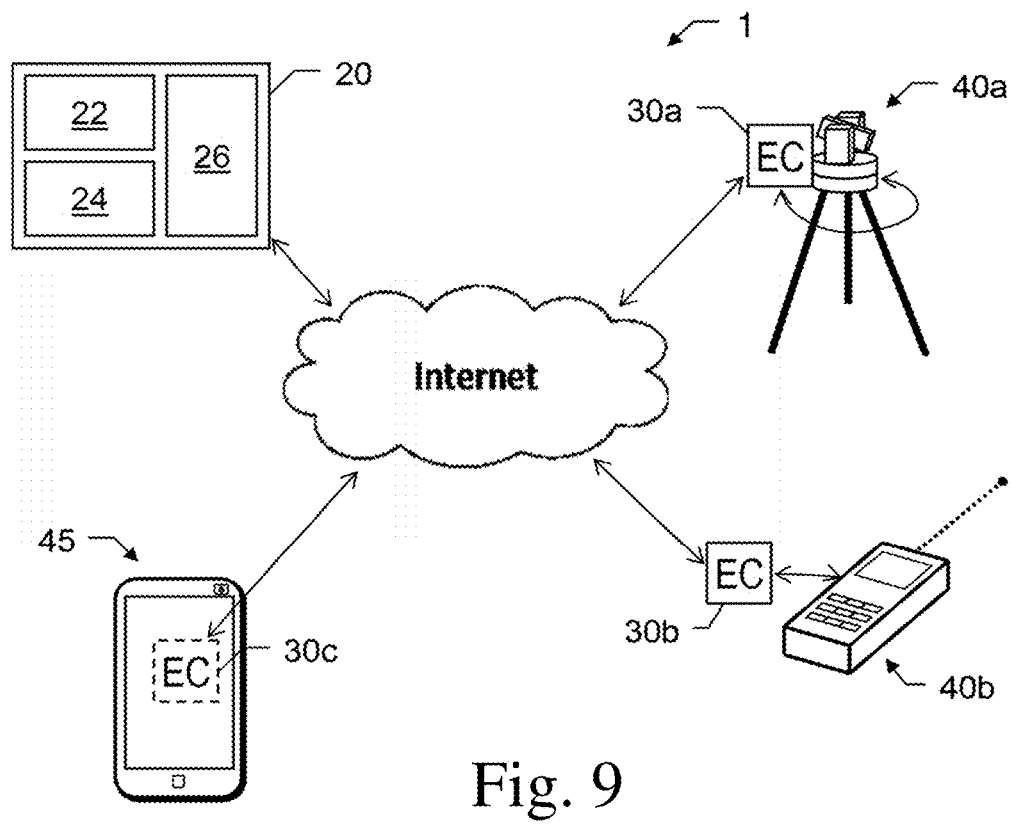
FIG. 9 shows an exemplary embodiment of a local measuring system as a part of a system according to the first aspect of the invention.

FIG. 9 illustrates an exemplary embodiment of a local system 1 that is embodied as a local measuring system and can be connected to and used with a digital services distribution system according to the second aspect of the invention. The shown system 1 comprises edge computing device 20 and three software agents 30a-c (EC), wherein two agents are provided in agent modules 30a-b, each of which being connected to surveying devices 40a-b, and one software agent 30c is installed directly on a user device 45, e.g. as a mobile device application ("app").

Such local systems 1 might also be configured as "ecosystems" of an Autonomous Connected Ecosystems (ACE) system. ACE are a state where data is connected seamlessly through the convergence of the physical world with the digital, and intelligence is built-in to all processes. This comprises cyber-physical systems as part of "Industry 4.0".

Although the depicted devices 40a-b in these examples are adapted as surveying devices, the agents can also be provided in or at other kind of devices. These can be actuating devices like machine tools, industrial machines, manufacturing robots or construction machinery. Also other kinds of measuring devices than the depicted ones can be used, e.g. reality capture devices, laser trackers or total stations. Also unmanned aerial or ground vehicles (UAV/UGV) comprising surveying or other measuring equipment can be used, e.g. surveying drones or inspection robots.

The modules 30a-b with the agents installed thereon are connected to external devices 40a-b and adapted to exchange data with the respective connected device. For instance, such a connection might include using a universal serial bus (USB) or other hardware interface or a wireless data connection such as Bluetooth.

In the shown example, the devices comprise a laser scanning device 40a, a hand-held laser distance meter 40b, and a portable electronic device 45 that is assigned to a certain user. For instance, the portable device 45 can be a smartphone or tablet PC or a wearable such as a smart watch. As device 45 is adapted to allow installing external software or deploying a set of microservices, the respective agent 30c can be provided as a software application directly in the external device 45 instead of being provided in a module that is connectable to the device 45. It is also possible to provide the software by app delivery, e.g. by means of a mobile app that can be used for a certain workflow only or for a multitude of different workflows.

The computing device 20 comprises a computing unit 22 having a processor, a memory unit 24 adapted for storing data, and a communication unit 26 (e.g. comprising a modem) allowing data interchange with the agents 30a-c.

Alternatively, the computing device 20 can be embodied by a plurality of devices, with a user device operated by a user and further devices for performing the computing. Also, the application may run in a cloud. The computing device 20 may optionally also be embodied by a cloud or a plurality of devices.

As shown, the computing device 20 can be connected via the Internet with the remote agent modules 30a-b and the portable device 45 comprising the third agent 30c. This is especially useful, if a direct data transfer is not possible because the devices are positioned at a larger distance from each other, e.g. more than a hundred meters away, or if, for instance, a workflow comprises capturing data of a skyscraper with multiple measuring devices positioned in several stories of the building.

Alternatively, the computing device 20 and the agents 30a-c can be grouped locally together and connected with each other, for instance wirelessly, e.g. by means of a wireless local area network (WLAN) or by means of mesh networks such as LoRa (Long Range Wide Area Network) or ZigBee or Bluetooth. Also, some devices or modules may be connected via Internet and others connected locally to the computing device 20. Also, devices or modules can have both local and cloud connections.

The computing device 20 can be a user device such as a personal computer that is operated by a user and comprises input means such as keyboard and mouse for entering or selecting a task to be performed by the devices 40a-b, 45. Alternatively, especially in case of the second embodiment, the computing device 20 can be another portable device (such as the user device 45).

The system may optionally also provide a functionality to orchestrate new functionalities for the devices 40a-c. These new functionalities may comprise e.g. algorithms, fog analytics, control system strategies or safety & security features. This is possible e.g. through a combination of publishing of device information and reflection (="self-description") of the devices' capabilities. The integration of all this information allows the orchestration of algorithms, analytics, etc. with the deployment of new workflows to specific systems. The system can play the role of the orchestrator of many systems with its ability to deploy workflows to other systems. Depending on the situation, one of the agents can also take the role of an orchestrator to manage other agents.

Also virtual devices can be formed that have capabilities of different devices merged. Devices can learn to understand, group and tailor device functionalities. Other devices can be mimicked. For instance, a total station, such as e.g. the Leica Nova MS60, could mimic the functions of a laser scanner, a handheld distance meter or even a plumb.

A multitude of local systems 1 like the one described in FIG. 9 can be connected by a system according to the second aspect of the invention.

Figure 10:
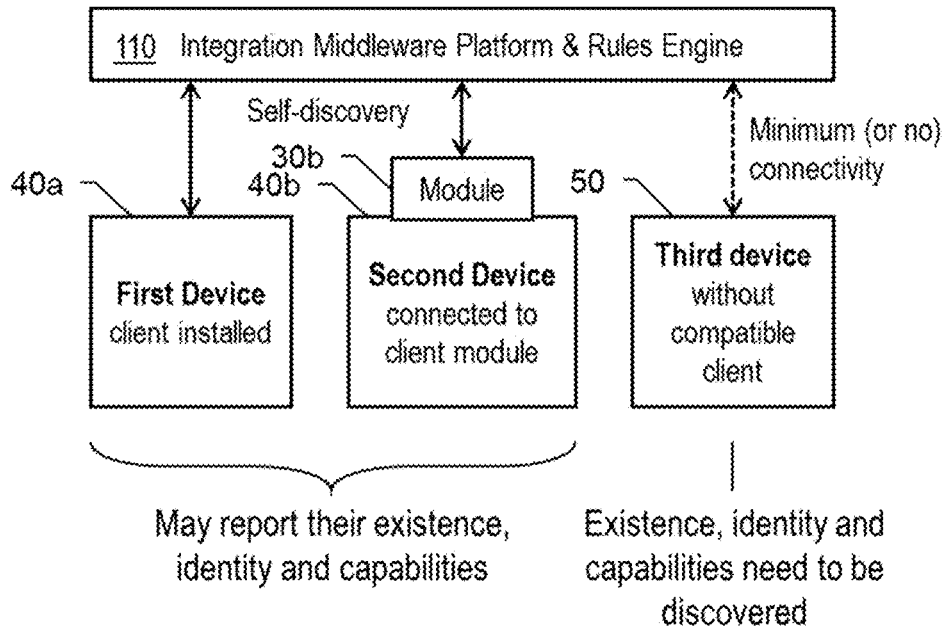
FIG. 10 illustrates a first exemplary embodiment of a system according to the second aspect of the invention.

FIG. 10 illustrates a first exemplary embodiment of a system according to the second aspect of the invention. A plurality of devices comprising first devices 40a, second devices 40b and third devices 50 are connected to a frontier platform—such as the depicted integration middleware platform 110 comprising a rules engine—, for instance via a local computing device (not shown here). As illustrated with respect to FIG. 9, first devices 40a have a client installed that allows communicating with the integration middleware platform 110, and second devices 40b are connected to a module on which a client 30b is installed. The clients make the first and second devices compatible with the integration middleware platform 110, so that they may report their existence, identity and capabilities to the system. This form of self-discovery is also described in EP 3 522 015 A1.

It is however not so easy for the middleware platform 110 to communicate with third devices 50 that have no compatible client installed on or connected to. This means that these devices' existence, identities and capabilities will need to be discovered if they are to be used by the system.

In some embodiments of the discovery process, at least a minimum connectivity is required, i.e. at least some means of electronic communication interface, particularly allowing wireless communication, must be available in the device 50.

In other embodiments, third devices 50 could be completely passive and do not have to be connected. In this case their existence may be detected by any means of sensing devices connected to the system, e.g. sensors that are part of one of the first or second devices. In an early stage of discovery, it might be sufficient to learn about such an unconnected device by indirect measurements and sensor data connected to first or second devices even before a connection with the platform 10 exists or is discovered.

Figure 11:
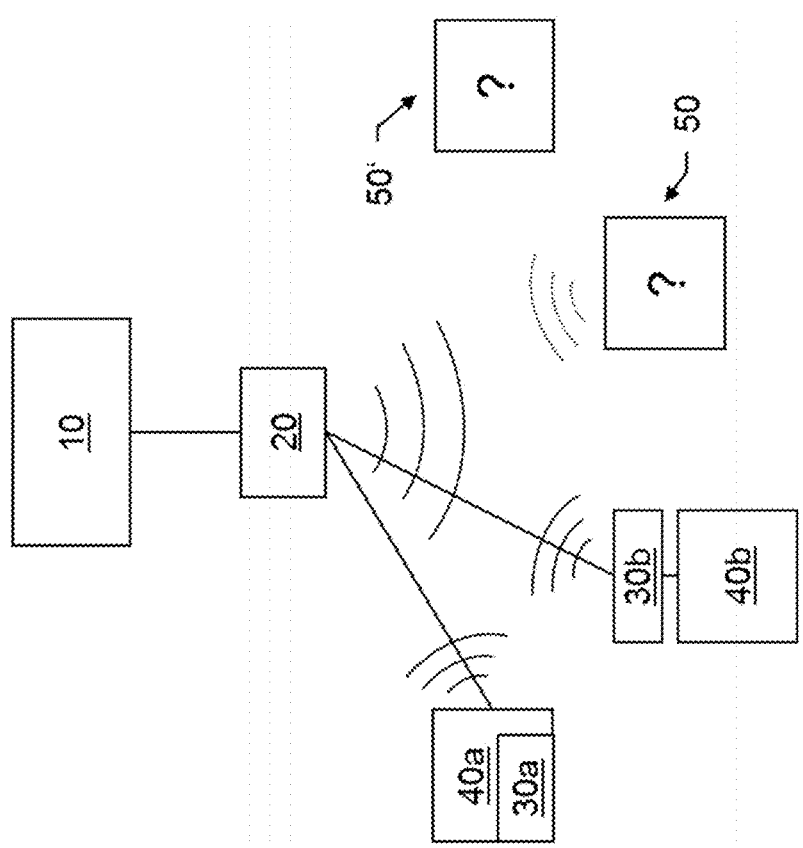
FIG. 11 illustrates a second exemplary embodiment of a system according to the second aspect of the invention.

FIG. 11 illustrates a second exemplary embodiment of a system according to the second aspect of the invention. A local communication device 20 is connected with the middleware platform 110, for instance via an Internet connection. The communication device 20 and four electronic apparatuses 40a, 40b, 50, 50' are present at a site. As illustrated with respect to FIG. 9, these apparatuses may comprise measuring devices as well as other kinds of devices, such as, e.g. sensor devices, production devices, processing devices or transporting devices.

Some devices have a self-description ability or are adapted to communicate with the communication device 20 to exchange data that allows the communication device 20 to obtain data that allows identifying the devices and their capabilities. In the example of FIG. 11, there is a first device 40a that has a software agent 30a installed to provide the communication functionality that allows identifying the device's capabilities. There is moreover a second device 40b that is connected with a module that has a software agent 30b installed to provide the same communication functionality.

Some devices 50, 50' at the site, however, do not have an agent installed, so that their identity and capabilities—and possibly even their existence—are unknown to the system. There are two of these "third devices" (described in FIG. 10) depicted in FIG. 11. However, there can be a multitude of these devices that are generally incompatible with the integration middleware platform 110. For instance, these devices are from third party manufacturers or have an outdated software installed and thus are not able to communicate their identity and capabilities to the system. If at least a minimum connectivity is provided, as is the case for device 50, it can be possible for the communication device 20 to detect that device's presence and start a discovery process in order to determine the device's identity and usable capabilities. If no such connectivity is provided, as is the case for device 50', the communication device 20 is not enabled to automatically detect the device 50' and discover identity and capabilities of the device 50'.

Figure 12:
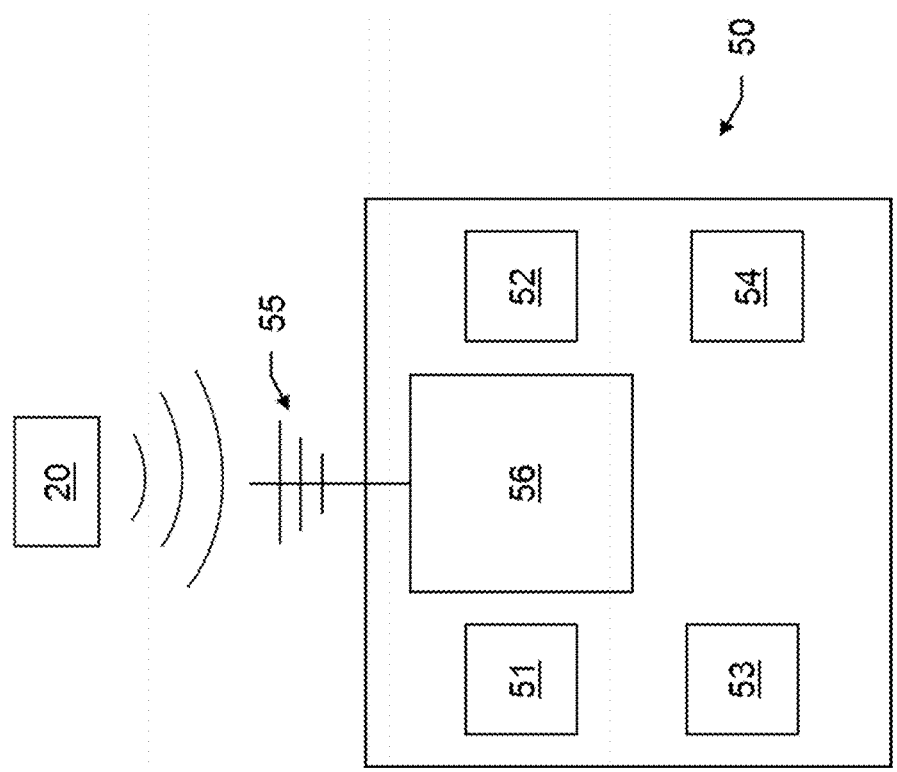
FIG. 12 illustrates a third exemplary embodiment of a system according to the second aspect of the invention.

FIG. 12 shows an exemplary embodiment of such a "third device" 50 having minimum connectivity. The depicted device comprises four components 51-54 providing functions and capabilities that are unknown to the system and should be discovered. The device further comprises communication means 55 that allow minimum connectivity with the local communication device 20 that is connected to the middleware platform (not shown here) and a control unit 56 that provides computing and data storage capability for controlling the components 51-54 of the device 50, e.g. gathering data of components that comprise sensors and making said data available via the communication means 55 or on a user interface (not shown here). The communication means 55 may be adapted to receive software updates or remote controlling instructions.

Figure 13:
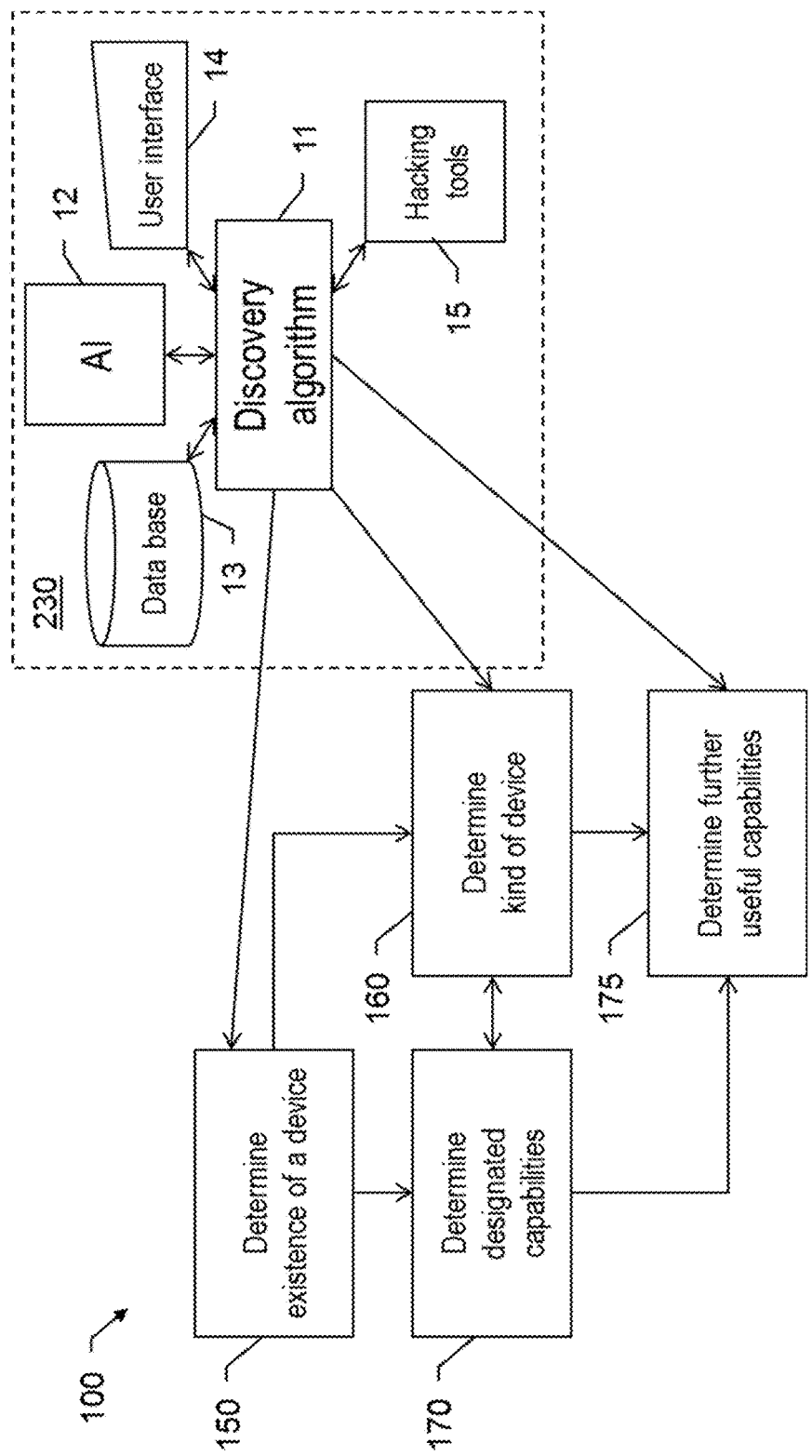
FIG. 13 illustrates a first embodiment of a method according to the invention being performed by an exemplary embodiment of a computer system according to the second aspect of the invention.

FIG. 13 illustrates on its left portion an exemplary embodiment of a method 100 for identifying capabilities of an electronic apparatus according to the second aspect of the invention. On its right portion, FIG. 13 illustrates tools 11-15 that may be used by the computer system to perform the method 100 or steps thereof as a computer-implemented method.

The illustrated method starts with determining the existence of a device (step 150). When the existence is known, the kind of the device, e.g. the type or model, needs to be determined (step 160). Additionally or alternatively, designated capabilities of the device can be determined (step 170). Designated capabilities are those capabilities that are related to the purpose of the device. For instance, designated capabilities of a laser scanner comprise a scanning functionality, and designated capabilities of a vehicle comprise a transportation functionality.

Based on the information about type or model of the device and/or its designated capabilities, it is also possible to determine further useful capabilities that are not designated, e.g. unintended, capabilities (step 175). Not designated capabilities comprise those functionalities that the device can be used for although it is not the purpose of the device to perform these functionalities. In some embodiments of the second aspect of the invention, it might be necessary to reconfigure the device to perform these unintended functionalities, in some embodiments these functionalities are inherent side-effects of a designated capability, and in some embodiments they are auxiliary or secondary capabilities which the device has to allow or improve for performing the designated "main" capability. For instance, a laser scanner—having the designated capability to scan a surrounding—has the unintended capability to perform single point measurements or to generate heat, vibrations and sound or noises by running its rotation motors.

The method 100 is performed by a computer system comprising a historian and observer module 230 (shortened: HOM or observer module) having a data connection with the middleware platform and a local communication device (not shown here), the local communication device being provided at the site of the devices and connected to the middleware platform (see FIG. 11). The observer module 230 comprises implemented tools 11-15 that allow performing the method and is provided remotely in a cloud, or at the edge of the network, interacting with a cloud. In some embodiments, some or all tools may be provided at the middleware platform or the local communication device instead, so that some or all calculations may also be performed directly at the middleware platform or the local communication device.

One or more discovery algorithms 11 are configured to perform the steps of the shown method 100. The algorithm 11 has access to the other tools, comprising an artificial intelligence (AI) 12, one or more data bases 13 and optionally a user interface 14 and hacking tools 15.

Identifying the device may comprise establishing a data connection, for instance using hacking tools 15 to gain access to a computing or controlling device of the unidentified device. Protocols and functions are then installed on the device for identifying the device or its capabilities. This may be done by a trial-and-error method, giving random commands in a variety of known command languages and machine languages to control functions of the device that are assumed to be present. A reaction of the device is monitored to determine whether a command has given rise to a result. From the result, it can be deduced that a certain language is understood and that a certain function is present in the device. This deduction can be performed with the aid of the AI 12 and/or using a data base 13.

A data base 13 may comprise information about attributes of a multitude of known types of devices and identifying a type of device may comprise identifying such attributes of the device. Determining the known type optionally comprises using probabilistic evaluation based on the identified attributes, particularly correlation. This evaluation may be performed using the AI 12 that is programmed to analyse the available information about a device. Here both unsupervised and supervised machine learning techniques can be used. In the case of unsupervised AI, algorithms such as dimensionality reduction and clustering of data can be used. Based on attributes of a particular device, such techniques can indicate the degree of similarity to other types of devices, point out the closest fitting device type, or determine an anomaly score. In the case of supervised AI, algorithms trained on known device types and their attributes, or on historical data, can be used. In particular, classification methods based on, e.g., linear classifiers, support vector machines (SVM), Kernel estimation (such as k-nearest neighbour), decision trees (such as random forest) and/or neural network models (such as CNNs or RNNs) allow for discrimination of device types and hence for a classification of the device at hand. If the identified attributes of the device match attributes of more than one known type, recursively more attributes of the device may be identified to narrow-down the possible types.

For instance, if no unambiguous result can be achieved, a human user can be asked by the system, using the user interface 14, to identify the device. Alternatively or additionally, other devices in the vicinity of the unidentified device that comprise one or more camera or similar imaging devices can take images of the unidentified device. Using image analysis, the kind or model of device may be identified or narrowed-down to speed-up identification by other means. Likewise, other information about the device may be determined using image analysis. For instance, a manufacturer of the device may be identified, which may facilitate the communication unit establishing a communication link to the device to allow accurately identifying the device and its capacities using the hacking tools 15.

It is also possible to identify some unidentified devices, their capabilities, operation modes and conditions by means of microphones or other acoustical or vibrational sensors carried by other devices in the vicinity of the unidentified devices. Sound, noises or vibrations of e.g. the motor units or of rotating parts within an unidentified device can give valuable indications on the device's type and/or its present operation mode and condition. For instance, a presence of a device may be detected by a camera; using a microphone, it can be detected whether the device produces sounds from which capabilities, operation modes or conditions can be derived. The sounds could be that of a combustion engine or of a fan which would indicate that the device is running. The sounds may also comprise acoustical signals from the device such as audio warnings which might indicate an error condition of the device.

If the device is unknown to the system and there is no information in available data bases, an internet search for available information may be started automatically.

For identifying attributes of the device, a candidate model may be generated comprising an assumed type and/or assumed functions of the device, and the assumptions are then verified. Alternatively, a degree of fulfilment of the assumptions may be determined. Using a candidate model can reduce the time needed to identify a device, since the most probably present attributes are verified first.

The candidate model may be generated based on available basic information regarding the device. Moreover, environment information or historical data can be considered when generating the candidate model. The environment information comprises information about devices that are typically present or to be expected in the environment of the device that is to be identified. The historical data may concern previous identification of capabilities.

Verifying the assumptions or determining the degree of fulfilment of the assumptions may comprise using the hacking tools 15 to gain access to a data storage unit of the device, to execute, based on an assumed type of the device, commands for activating assumed functions of the device, and monitoring a behaviour of the apparatus in response to each command.

Thus, a position of the device in a high-dimensional configuration space can be determined, the position being related to location, time, regulations and a state of the apparatus. The position in high-dimensional configuration space for instance may comprise at least a geographical location and an affiliation with a certain project within a certain time frame.

Having identified the device, it can be decided whether the device is added to the system and/or granted access to information on the middleware platform. This can be done either automatically or by a user via the user interface 14.

Also, some devices may have been customized and thus have enhanced or limited capabilities, e.g. special features or disabled functionalities that differentiate the device from a standard device. Other devices may have malfunctions or other issues, wherefore some of their capabilities are disabled or restricted. Such non-standard conditions of a device preferably are determined after the device is identified.

The FIGS. 6a and 6b illustrate by way of example designated and not designated capabilities of the device of FIG. 12. Said exemplary device comprises four controllable components 51-54, consisting of a laser distance meter 51, a temperature sensor 52, a rotation drive 53 and a cooling fan 54.

The laser distance meter 51 provides a distance measuring capability 61. The rotation drive 53 is intended to provide a laser rotation capability 63, i.e. rotation of an emission direction for the laser distance meter 51. In combination, the distance measuring capability 61 and the laser rotation capability 63 provide the device's designated scanning capability 66.

Since the rotation drive emits heat when in operation, which might negatively affect the scanning capability 66, the temperature sensor 52 is intended to provide a temperature sensing capability 62 in the device and to control the intended cooling capability 64 of the fan 54. The cooling capability 64 allows the device's overheating prevention capability 65 prevent an overheating of the device due to the rotation drive's heat emission. The overheating prevention capability 65 allows the distance measuring capability 61, and the laser rotation capability, to work properly.

Having identified these designated capabilities and the device as being a laser scanner, the computer system identifies further capabilities that are not designated capabilities. This can be performed using the discovery algorithm 11 described with respect to FIG. 13 and further tools such as an AI 12, data bases 13 and hacking tools 15.

Figure 14A:
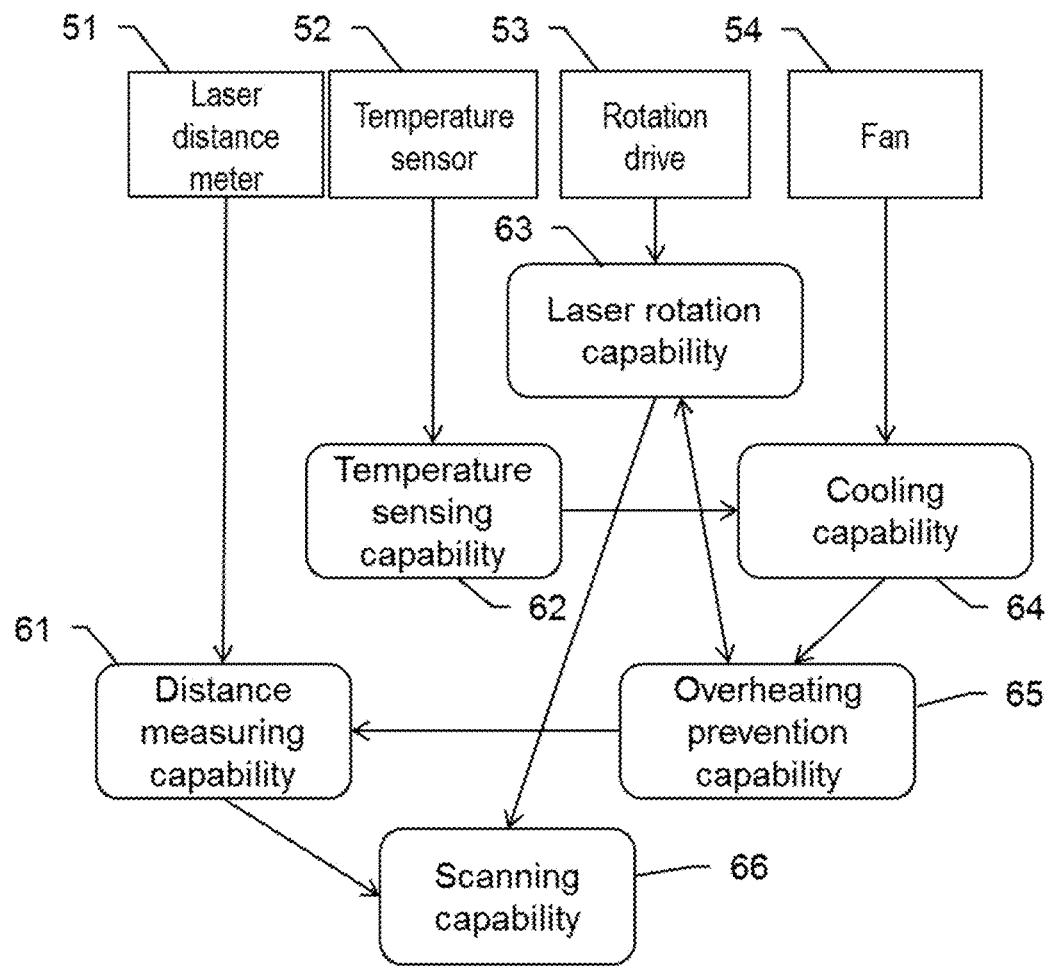
FIG. 14a shows components of an exemplary apparatus, illustrating intended capabilities of the apparatus that result from the components.
Figure 14B:
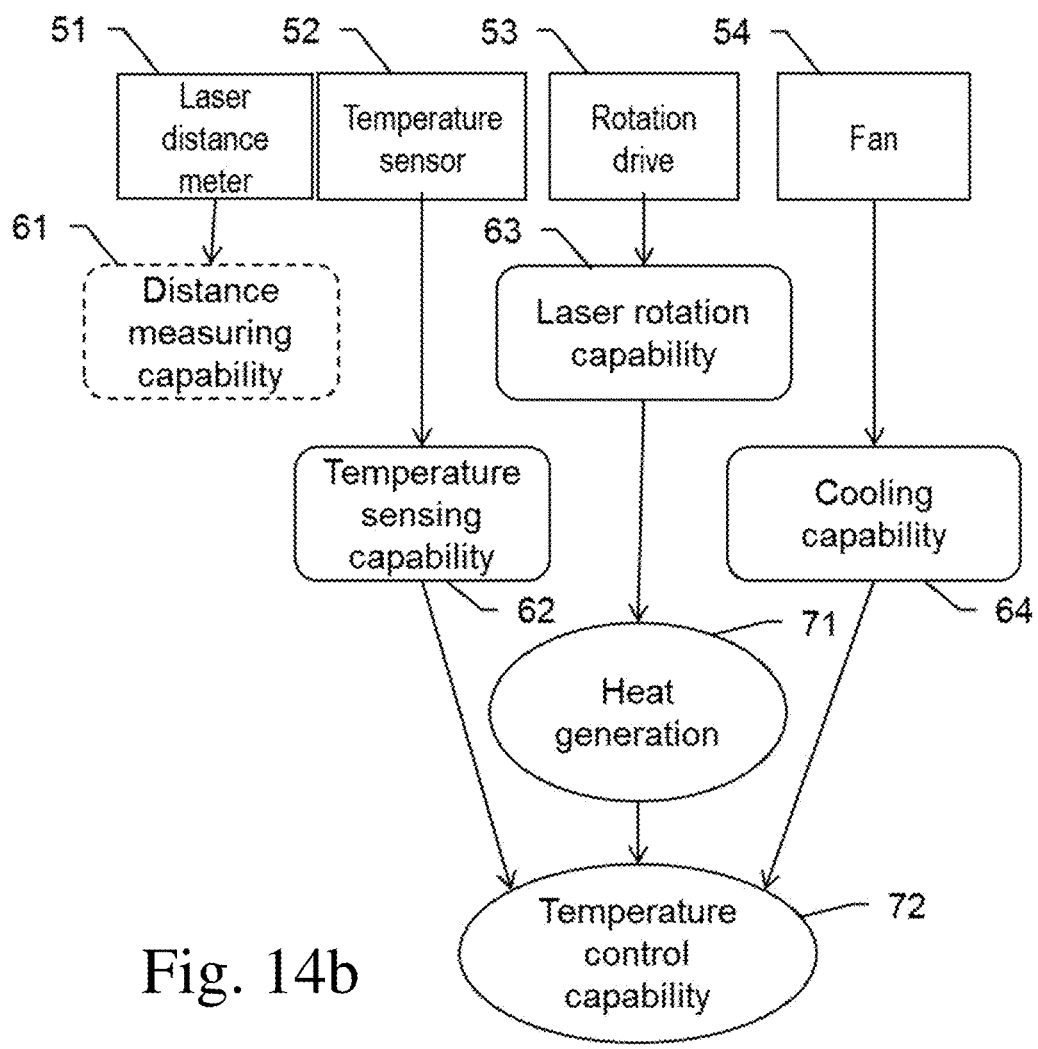
FIG. 14b shows the components of FIG. 14a illustrating exemplary unintended capabilities of the apparatus that result from the components.

Using the exemplary device of FIG. 14a, FIG. 14b illustrates the conversion of said device for other purposes than the designated scanning. If, for example, the environment is too cold for another device to work properly, and there is no device with designated heating capability available, the computer system, using the discovery algorithm and the other tools, will look for temperature control capabilities in other devices that are available at the site.

Since the device with the rotation drive 53 comprises a device that generates heat by its laser rotation capability 63, this can be used for the unintended capability of heat generation 71. Since the device also has a temperature sensor 52 with a temperature sensing capability 62 and a fan 54 with a cooling capability 64, a temperature control capability 72 arises that allows controlled heating of the environment without jeopardizing the device's integrity. The distance measuring capability 61 of the device's laser distance meter cannot be used (or at least not used with the same effectiveness) while the not designated capabilities are used.

Other examples comprise performing a measurement task by a measurement device, wherein the measuring environment needs to be lighted but a lighting unit of the measurement device is broken or missing. In that case another device in the vicinity can be identified that need not be lighting devices but have a light source nonetheless.

Figure 15:
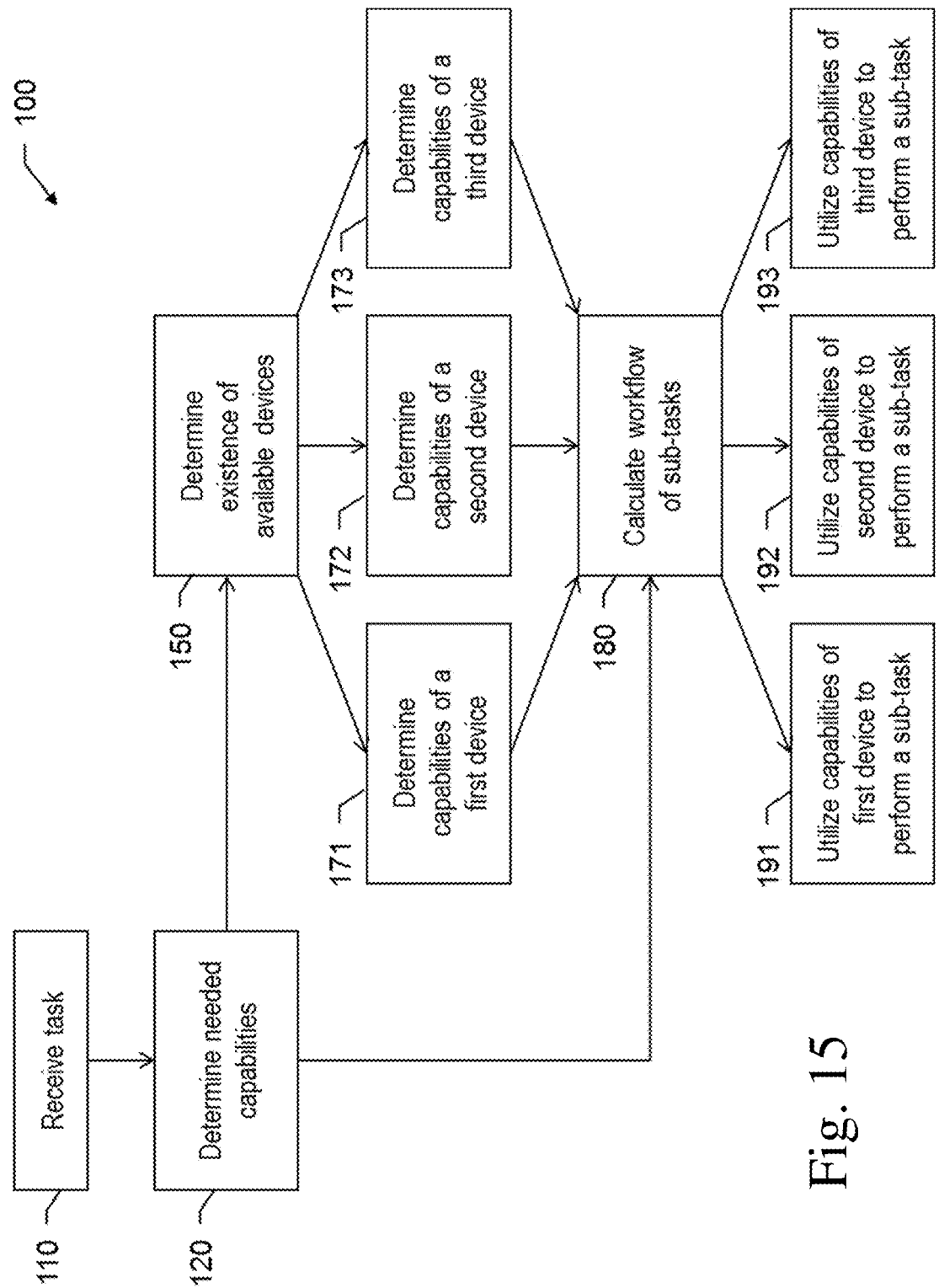
FIG. 15 illustrates a second embodiment of a method according to the second aspect of the invention.

FIG. 15 shows a flow chart illustrating a second exemplary embodiment of a method 100 according to the second aspect of the invention. In this embodiment, the method starts with receiving a task 110. In a next step, needed capabilities for performing the task, possibly consisting of a multitude of sub-tasks, are determined 120. The existence and availability of devices for performing a part of the task is then determined 150. As illustrated further above, this may include a self-identification of the devices or a discovery of the devices by a discovery algorithm of the system. Capabilities of a first, a second and a third device are then determined 171-173. These devices for instance may be those kinds of devices described with respect to FIG. 10, or any three devices. The determined capabilities may be the designated capabilities or discovered capabilities that are not the designated capabilities. Based on the needed capabilities for the sub-tasks of the task and based on the determined capabilities of the three devices, a workflow of sub-tasks is calculated 180. Steps 150 and 171-173 of the method 100 can be performed within the context of the mechanism described with respect to the computer system 200 of FIG. 21.

Utilizing the capabilities of the three devices, sub-tasks are performed 191-193 according to the calculated workflow. This may include using "designated" and "not designated" capabilities of the devices, i.e. capabilities that had or had not originally been intended or foreseen for such tasks or sub-tasks. Some or all of the device may have to be reconfigured to use some of their not designated capabilities. Reconfiguring devices for being used in the workflow, e.g., can be performed as described in EP 3 522 003 A1, or by means of the hacking tools as shown in FIG. 13. Combinations or chains of devices may carry out a sub-task jointly, e.g. if each one of them would not have been capable to execute—either in a proper manner, within a given time limit or because they were simply lacking the individual capabilities.

As described in EP 3 579 161 A1, the workflow may be modified if a problem is reported. For instance, in the example of FIG. 14b, one device involved in the workflow might determine and report that it is too cold to properly perform the given task. Then, the computer system automatically determines a solution which includes another available device to produce additional heat.

Figure 16:
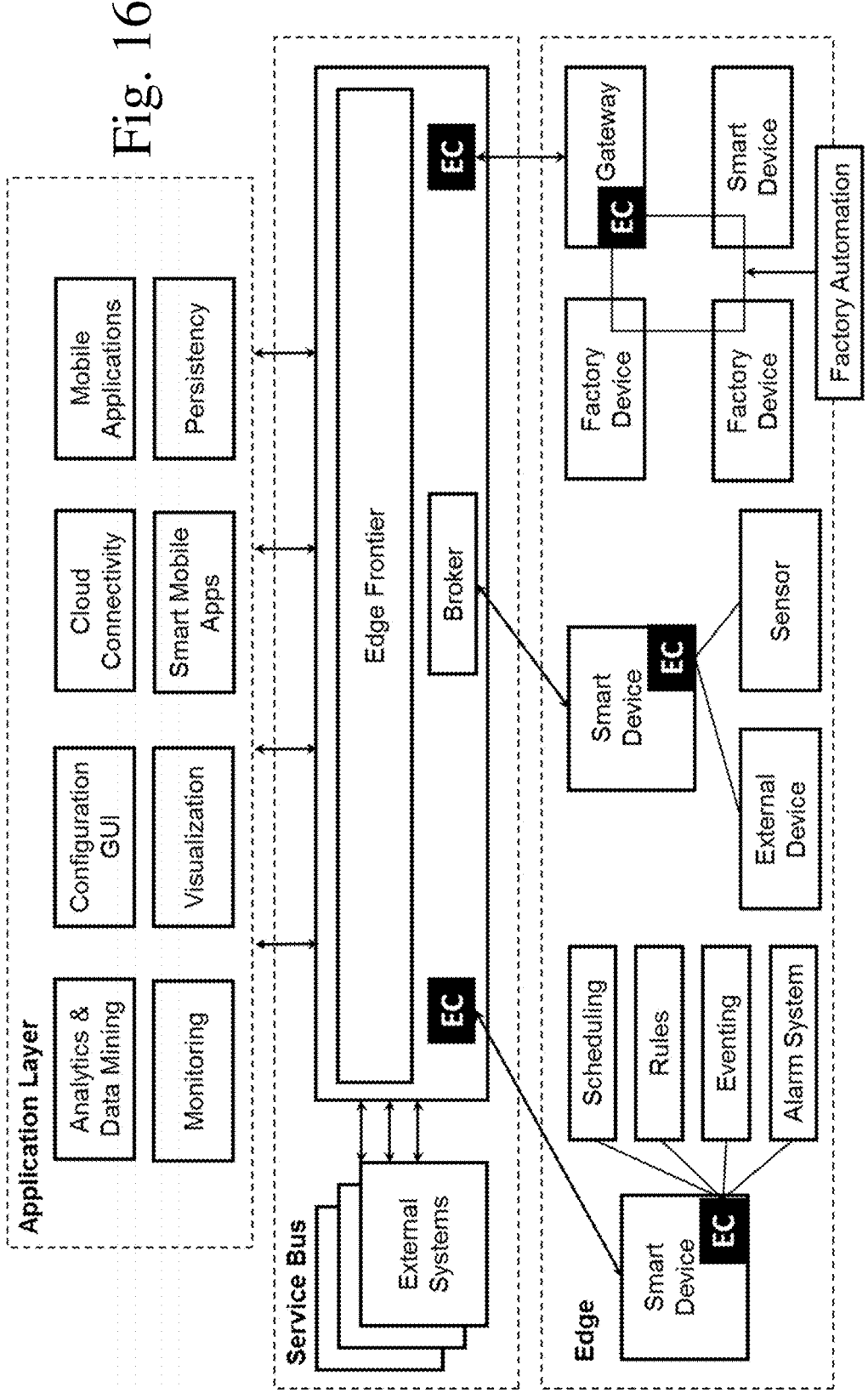
FIG. 16 shows an exemplary embodiment of a system according to the invention, illustrating data flow between multiple layers and local systems.

FIG. 16 illustrates data flow between multiple layers and local systems in an exemplary computer system according to the second aspect of the invention. An enterprise service bus implements a communication system between mutually interacting software applications in a service-oriented architecture. As it implements a distributed computing architecture, it implements a special variant of the more general client-server model, wherein, in general, any application using the service bus can behave as server or client in turns. The service bus promotes agility and flexibility with regard to high-level protocol communication between applications. The primary goal of the high-level protocol communication is enterprise application integration of heterogeneous and complex service or application landscapes. In the illustrated system, the service bus is run using "EdgeFrontier" (EF) technology, connecting with a multitude of local systems at the "Edge". The term "edge" refers to the geographic distribution of computing nodes in the network, e.g. as Internet of Things (IoT) devices. In this example, each of the local systems comprises at least one device that is equipped with an "EdgeClient" (EC) software agent (described above with respect to FIG. 9), providing data transfer with the EF service bus.

Figure 17:
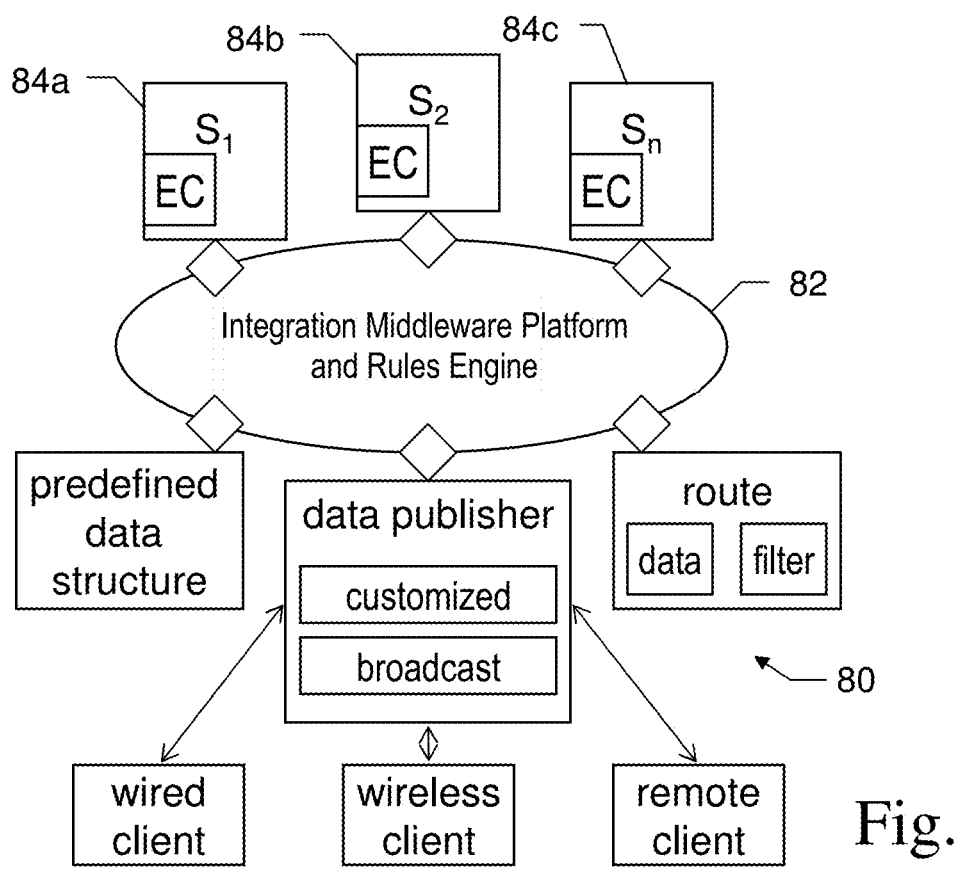
FIG. 17 illustrates an intelligent information platform used together with a system according to the second aspect of the invention.

FIG. 17 illustrates an intelligent information platform that can be used together with a system according to the second aspect of the invention and in some embodiments forms a part of the system according to the second aspect of the invention. In general, such a platform is described e.g. in the document EP 3 156 898 A1. The intelligent information platform provides a fully configurable distributed ERP-like (ERP=enterprise resource plan) information processing platform 80 that routes the information, based on certain rules and policies to a centralized decision engine 82. By embedding software agents providing extensible IoT edge solutions, such as EdgeClient (EC), the customized adapters 84a-c, as annotated by $S_1 \ldots S_n$, can be made intelligent through edge analytics and dynamically deployable workflows while still residing inside those external systems.

Such a platform can be enabled with the functionality of the apparatuses that can share, synchronize, reason and cooperate between each other about the processes they realize. The ability to realize a process is a capability. Each capability (e.g. drilling, carrying) relates to an atomic and single activity with multiple input and output parameters (position, temperature, humidity etc.). Such an apparatus— regardless of whether it is a "First", "Second" or "Third" device of FIG. 10—may also be called "agent".

The concept of autonomous devices communicating and synchronizing each other's behaviour is widely developed under the term "multi-agent system" (MAS) or self-organized system. Two different MAS are illustrated in FIGS. 18a and 18b, FIG. 18a showing a simple reflex agent and FIG. 18b showing a learning agent. In this context, an agent is a device that, using sensors, gathers data that is organized and classified as input and output parameters for the capabilities. Algorithms need to be provided that occur at the moment the state of "what is the world like now" is translated into the description. The agents are cognitive and work in the continuous environments. Any sophisticated capability that cannot be described by the simplification of "input parameters, action, output parameters" has to be divided into a chain of related capabilities.

After gathering the information from the sensors and its quantification into data, a learning element and performance element use AI by means of e.g. heuristics, machine learning algorithms or evolving programs such as genetic programming to reason about the possible combination of capabilities. Both, learning and performance elements may be implemented as EC services and used in the context of the system and method according to the second aspect of the invention. Here, the sensors include inter-agent communication protocol over Message Queuing Telemetry Transport (MQTT) or other means of communication, that are utilized by EC. The conducted actions are not only including the physical operation of the device, but as well EC communication over MQTT and negotiation for the cooperation of the devices.

In the example scenario of FIGS. 11a and 11b, a system comprises the three agents "Car", "Drone" and "Laser Tracker" as members of a system, each having certain capabilities represented by API functions. In the scenario of FIG. 19a, the car is assigned a movement task "A" but cannot perform this task. A human operator would be able to reason that the drone could do the job instead of the car and map the task from the car to the drone accordingly.

However, an MAS is not capable to understand the meaning of the API functions that make up the capability of an agent. In order to discover whether another member of the system has the desired capability, an iterative process is used: First, the next best agent is identified, then mapping of functionality is attempted. The next best agent could be chosen either generally or based on a specific desired capability. The general idea is to look at the context of the agent (mapped to a multi-dimensional vector space), without knowing the features of the space. Features could be generated using AI, in particular evolutionary algorithms such as genetic algorithms, genetic programming and/or heuristics, as part of an optimization problem where the goal is to maximise separation of agents in the vector space whilst following certain constraints (e.g. successful or failed mapping operations). The table of FIG. 19b gives an idea of what features the AI might come up with. Evolutionary approaches could be used to map functionalities from one agent to another agent. Under the assumption that the agent "car" has a function getTemperature( ) which returns temperature in Celsius whilst the agent "drone" has a function getTemperatureFahrenheit( ) which returns temperature in Fahrenheit, based on history of function calls the algorithm might be able to correlate the functions due to the underlying distribution of the data (e.g. seasonality in temperature, day/night pattern, etc.).

Figure 20:
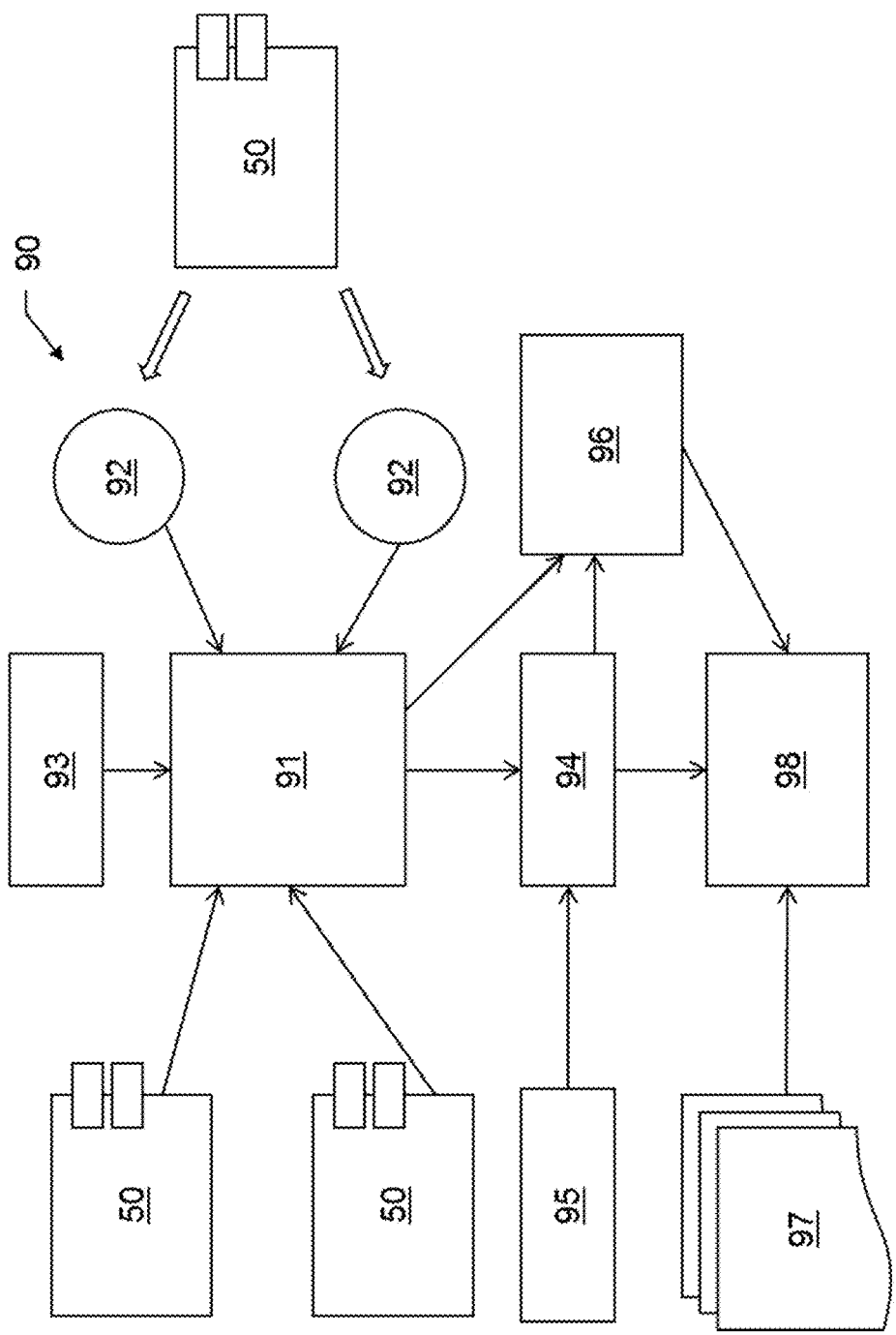
FIG. 20 illustrates a fourth exemplary embodiment of a system according to the second aspect of the invention.

FIG. 20 illustrates another embodiment of a system 90 according to the second aspect of the invention that allows performing a nonstandard, i.e. unusual, job scheduling, which comprises finding and associating entities 50 that may or may not be designed to fulfill a certain job at hand. The entities 50 may be third devices as described above, e.g. with respect to FIG. 12.

Within the system, data from three observable entities 50, each having a number of parameters, is gathered in a first memory 91. The definition of entity 50 is highly flexible and depends on the application. Gathering data may comprise that the data can be "actively" sent on some arbitrary purpose or be gathered "indirectly" by observation from outside the entity 50—i.e. by observations performed by sensors 92, such as optical, acoustical, thermal, magnetic or electric field sensors. These sensors 92 determine any measurable change or status of the observed entities 50, such as e.g. light and color changes, sound or noise, heat, electric and magnetic fields, or other radiation. The data can be augmented by feeding in prior knowledge 93, e.g. machine specifications or associations of entity and operators.

In a more and more connected system, data can be gathered and entity properties derived. This can be aided with the prior knowledge 93 and with additional sensor data to gain more, better quality or timely information. Algorithms based on simple statistics to highly specific AI can be employed to associate, classify and group relevant entity parameters.

The gathered data may be provided from the first memory 91 together with data from a second memory 95 that comprises parameter and entity associations and matching likelihoods to a data processor 94. There, using e.g. statistics and artificial intelligence, and comprising a continuous process of finding similarities, classifying, grouping, deriving parameters and associating to entities, the data is processed. The gathered data and the processed data can be sent to a display 96 or other human interface to allow human supervision.

The processed data and task data 97 with requirements for the given task, e.g. comprising a list of parameters, are matched using algorithms to prioritize tasks for the entities 50 and to dispatch a task assignment as a decision 98 of the system 90. Especially in a first phase, depending on the maturity of the system final decision, a user interaction, based on the data presented on the display 96 can adapt the task assignment.

The system 90 of FIG. 20 may be deployed for a large variety of different applications. A first example refers to a mining environment, where many vehicles of different types and for different purposes exist as observable entities 50. Vehicle types may comprise dump trucks for heavy loads, "regular" automobiles, e.g. for inspection and small loads, and emergency vehicles (small loads, but typically bigger than that of "regular" automobiles). The types may also comprise electric and combustion driven vehicles or road and rail operated vehicles, each having different load sizes and different areas where they are allowed or preferred to operate. In this example, the task would be to transfer some load from point A to point B, wherefore it is necessary to identify which entity can fulfill the job. The load may be characterized by size, by weight, whether it is splittable etc. An algorithm identifies all entities that are classified to be a vehicle (e.g. that are capable to move), identifies all vehicles that can carry the load (i.e. have a sufficient size for the load, or—if the load can be split—have a sufficient minimum size for a part of the load), and ranks the remaining list of vehicles. The job is dispatched to the highest ranked vehicle. Later, information is gathered whether the task was accomplished successfully and feedback is provided to the system to improve the automated candidate selection for the next tasks.

A second example refers to an identification of an entity that can be used to generate heat. In many machines, heat is a side effect. In a normal combustion engine or electric motor, the actual aim is to generate a mechanical movement, and the heat is "wasted" energy. However, for an unusual job this "waste" might be helpful to fulfill the job. In this case, the algorithm would search for all entities that show temperature measurements and then rank them by one or more parameters like observed sharp temperature rises in the past and temperatures measured at the entity that are not correlated with an environment temperature. Sharp temperature changes indicate that something in the entity can generate heat quickly, and uncorrelated temperatures ensure that the read temperature is not just a reading from the environment, thus indicating that the entity comprises an active heat generator. Alternatively or in addition, properties such as waste heat creation can be estimated, e.g. from entities' power consumption over time and their physical volume.

The needed information about an entity may be gathered using different means. For instance, these comprise
- an input to existing data, e.g. machine specifications;
- a link with existing systems, e.g. computer-aided dispatch or job-side control software;
- observing existing communication, e.g. over LAN or wireless such as Bluetooth, GSM or radio;
- the use of video surveillance and image recognition algorithms to identify the entity visually and/or the use of audio or vibration analysis algorithms to do so acoustically; and/or
- the installation and use of additional sensors.

If machine communication exists, a further option is mining data from a local machine bus (CAN bus based like J1939 or typical automobile ODB-2). Often, the application programming interface (API) provides names and parametrization of functions and values that are good sources for understanding what the data are about. Even previously unknown machines can be integrated into the system using API and protocol reflection.

In some embodiments, the entire system learns continuously. The more knowledge of good quality is in the system, the better it can build models to classify and add new data. Especially in the beginning, it is advantageous that the system is supervised, wherein each recommendation how to fulfill a given job is acknowledged or rejected by a human operator. The system can learn from this additional input to make better job assignments in the future.

The sensors may comprise:
- optical sensors, e.g. cameras or laser distance meters,
- acoustical or vibrational sensors, e.g. microphones, ultrasonic or time of flight meters,
- temperature sensors,
- infrared sensors, e.g. infrared cameras,
- electric or magnetic field sensors, e.g. ground penetrating radar devices,
- radiation sensors,
- mechanical and/or hydrodynamical sensors, e.g. configured for measuring volume, force, pressure, momentum or flow,
- inertial sensors such as inertial measurement units (IMU),
- positioning or navigation sensors such as GNSS, and/or
- integrated sensors, e.g. provided by coordinate measuring machines, laser trackers or laser scanners.

Figure 21:
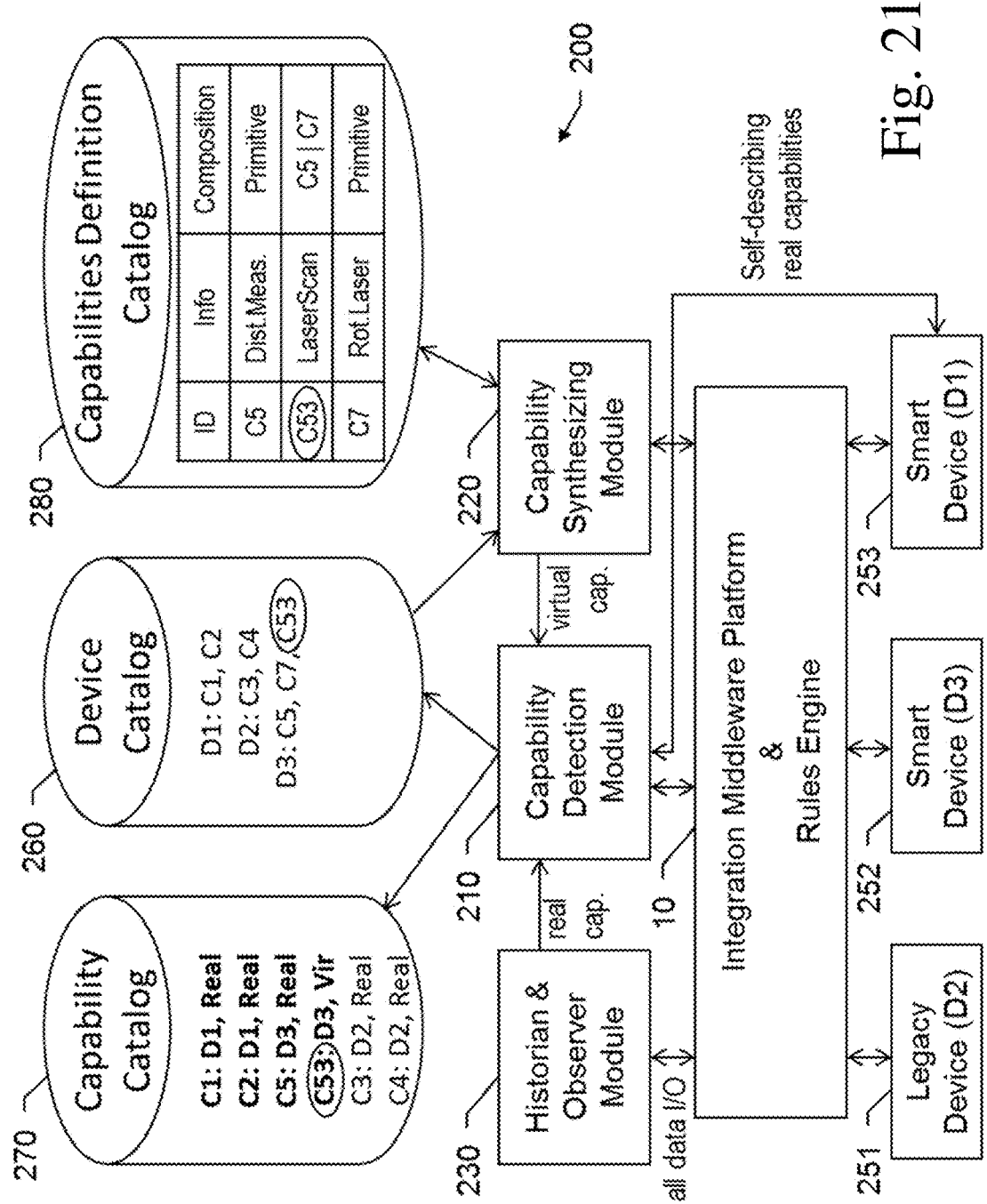
FIG. 21 illustrates a fifth exemplary embodiment of a system according to the second aspect of the invention.
Figure 22:
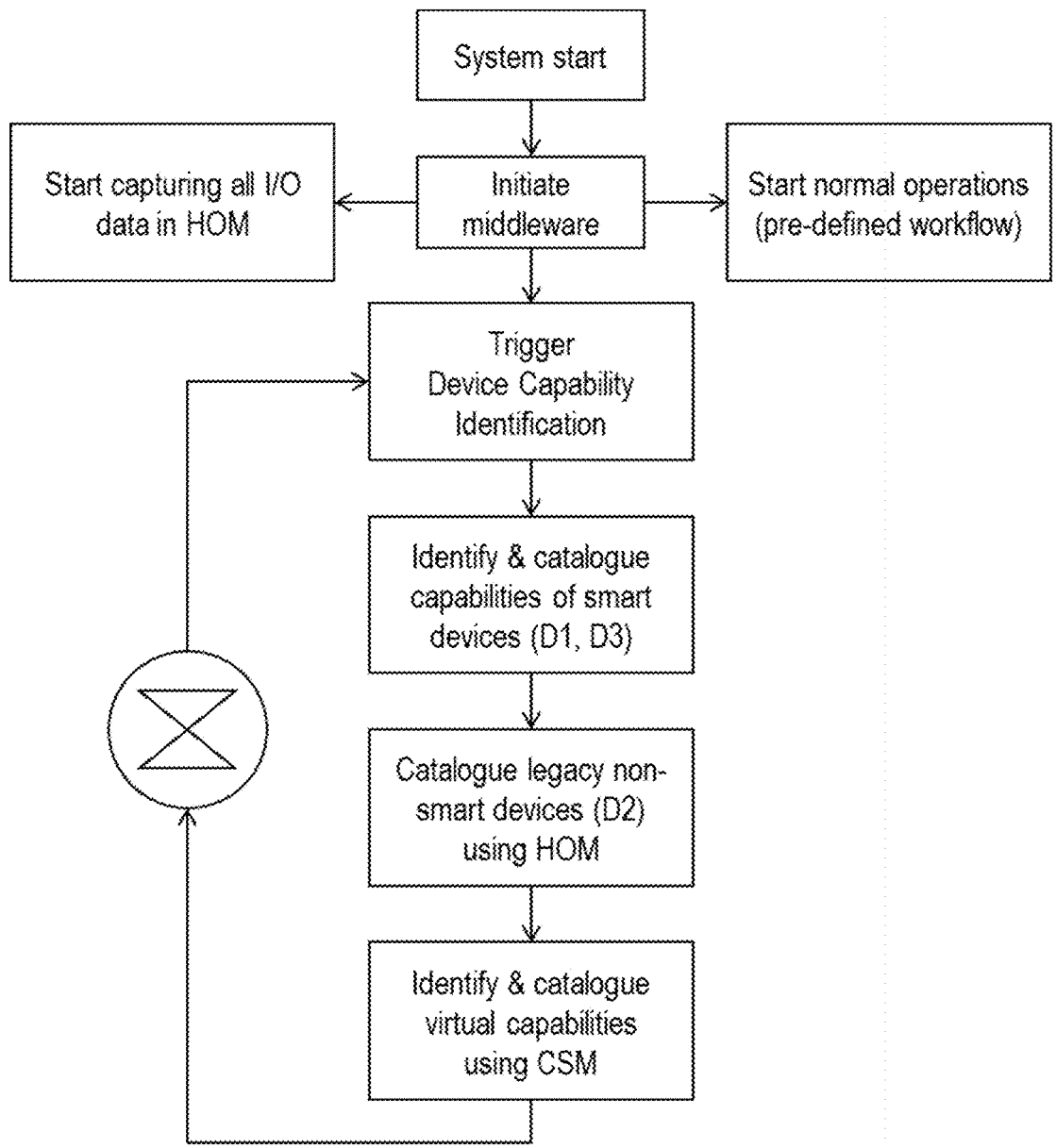
FIG. 22 shows an example of a workflow that is executable by the system of FIG. 20.

FIG. 21 illustrates a fifth exemplary embodiment of a system 200 according to the second aspect of the invention, and FIG. 22 shows a flow chart illustrating an example of a workflow that is executable by said system 200, e.g. as a part of a method for identifying capabilities of a group of devices according to the second aspect of the invention.

The system 200 comprises a number of "catalogs" that are databases, e.g. stored on a data storage device of the system.

The device catalog 260 is a database of the devices (D1, D2, D3) identified in the system 200 with a catalog of the available capabilities in each device. The devices can be smart devices 252, 253 (can be either hardware or a software) or legacy devices 251. The capabilities C1, C2, C3, C4, C5, C7 of these devices 251-253, i.e. the intended capabilities, have been automatically detected. This database provides a reverse-mapping of the information that is available in the capability catalog 270. In addition, this table contains a list of additional capabilities (C53) that are considered "synthesized" or "virtual" (Vir), in that they are computed or detected indirectly from the other available ("real") capabilities.

In some embodiments, the legacy devices 251 may be the third devices 50 of FIG. 10, and the smart devices 252, 253 may be the first and second devices.

The capability catalog 270 comprises a database table, structure, or graph containing all capabilities (C1, C2, C3, C4, C5, C53) available in the system that have either been detected through self-describing functions of the smart devices 252, 253 or automatically through an AI-based module such as an observer module 230 (here: historian and observer module).

All of the capabilities in this table are linked back to the devices (D1, D2, D3) that encompass those capabilities. The capabilities can be either "real" or "virtual". Real capabilities are available as intrinsic or primitive functions of a device. Virtual capabilities are identified or discovered functions that can be created or configured ("synthesized") through a mathematical function of other virtual or real capabilities.

The capability definitions catalog 280 provides two types of information:
- definitions of real capabilities (C5, C7) that are intrinsic and fundamental in nature and cannot be resolved into more primitive capabilities; and
- definitions for virtual capabilities (C53) in the form of rules to create ("synthesize") new virtual capabilities based on other real or virtual capabilities—for example, for a laser scanning capability to be available, a device needs to provide distance measurement, as well as rotating laser capabilities; similar constituting rules for other virtual capabilities are provided in this catalog.

By adding new capability definitions into this catalog 280, the system 200 becomes intelligent to discover new virtual capabilities that could be readily available for performing a given task that requires such capabilities.

The capability detection module (CDM) 210 is responsible for detecting and cataloguing all the capabilities in the system, whether real or virtual. For smart devices 252, 253, this module uses the self-describing functions of these entities to enquire and store the capabilities in the capability catalog 270 as well as in the device catalog 260.

For legacy devices 251, the CDM 210 uses the historian and observer module (HOM) 230 to detect real capabilities.

For both smart and legacy devices, the CDM 210 relies on the capability synthesizing module 220 to synthesize the virtual capabilities that are available in the system.

The capability synthesizing module (CSM) 220 synthesizes virtual capabilities from real capabilities utilizing the information from the capability definition catalog 280 and based on available devices and their capabilities in the device catalog 260.

The historian and observer module (HOM) 230 is activated to observe and learn the capabilities of legacy devices 251 that do not provide any smart functions for capability detection. In some embodiments, the legacy devices are the third devices 50 of FIG. 10. The HOM 230 has access to all the Input and Output (I/O) data streams that go into and emit from a legacy device 251 connected to the on-premises middle-ware platform 10, which comprises a rules engine.

Optionally, all three modules 210, 220, 230 may be connected to the integration middleware platform 110. Whereas the HOM 230 accesses device I/O data streams, also the CDM 210 and/or the CSM 220 may access the platform 10 for providing and/or receiving necessary data and instructions. For instance, this could comprise
- receiving trigger commands to start detecting or synthesizing capabilities,
- publishing a status information on the platform 10, or
- indirectly accessing self-describing capability interfaces of the smart devices 252, 253.

In some embodiments, the HOM 230 is configured to interact directly with the platform 10. Optionally, the middle-ware platform 10 may be a part of the computer system 200 and/or comprise the HOM 230. Alternatively or additionally, the HOM 230 may comprise the discovery algorithm 11 and the AI 12 of FIG. 10, optionally having access to the data base 13, the user interface 14 and/or the hacking tools 15.

By observing the I/O data streams, the HOM 230 can create an AI model of the device 251. Matching the pre-known capabilities from the capability definitions catalog 280 to the known capabilities of the pre-existing devices and their I/O data streams, the HOM 230 can identify the capabilities of a legacy device 251. Once these capabilities are identified, and optionally after having been validated by a human expert, they are stored in both device and capabilities catalogues 260, 270. If the newly identified capability is a new type of capability, this will also be stored in the capability definition catalog 280.

In the example of FIG. 21, the capability C53 is a "virtual" capability that has been synthesized from the capabilities C5 and C7 of device D3. Accordingly, this device comprises the synthesized capability C53 as well. In other examples, a virtual capability might need to be synthesized from capabilities of more than one device. In this case, these devices would need to work together to provide such a synthesized capability. In some cases, a device may already be configured to provide a synthesized capability, for instance simply by providing two or more capabilities jointly, e.g. at the same time or subsequently. In other cases, the device needs to be reconfigured in order to provide the synthesized capability. Information about such reconfigurations (which may require hacking tools as described above with respect to FIG. 13) can be stored as a part of or together with the definition for the virtual capability in the capability definition catalog 270.

Sensing signals may come into the system using connected devices. In a simple example that the desired effect is heat, e.g. because a device connected to the system needs to be heated in order to work properly. In this case, even if another device is not connected (or connectable) to the system and thus cannot be actively influenced by the system, it might still produce heat (e.g. process waste heat) that can be used to heat the device. In order to influence the amount of heat, one might simply change the relative position of the measuring device that needs to get heated, e.g. by moving it closer to the unconnected device.

In an early stage of discovery, it might be sufficient to learn about such an unconnected device by indirect measurements or from sensor data, e.g. provided by first or second devices, even before a connection exists or is discovered. Devices that are not connected to the system can be detected, classified and cataloged, e.g. using the sensors of the system described with respect to FIG. 20. Once these devices are detected and at least some of their capabilities are known or can be assumed, the system can try to detect or establish a connection with these devices or simply dispatch an operator, e.g. to turn on a switch in order to connect the device.

Steps 150 and 171-173 of the method 100 described with respect to FIG. 15 can be performed within the context of the mechanism described with respect to the computer system 200 of FIG. 21.

As illustrated with respect to FIG. 22, a workflow using the system 200 of FIG. 21, after a start of the system and the initialization of the middleware 10 runs as follows. Normal operations according to a pre-defined workflow are started and all I/O data streams are captured in the HOM 230.

At certain points of time during the workflow, e.g. according to a defined frequency (such as every hour, once a day etc.), identification of device capabilities is triggered using the CDM 210. Subsequently, capabilities of the system's smart devices 252, 253 are identified and catalogued in the capability catalog 270. Next, the legacy, i.e. non-smart, devices 251 and their capabilities are catalogued using the HOM 230. The CSM 220 is then used to identify and catalogue the virtual capabilities. After a certain period of time, e.g. according to the defined frequency, a new device capability identification is triggered (time-triggered). For instance, the frequency may be defined based on an average number of devices that are added to and/or removed from the system per time unit.

Alternatively or additionally, a new device capability identification can be performed user-triggered or event-triggered, e.g. when a new device becomes available or a previously available device is removed or loses a capability, and this event is detected by the system or a user of the system. Alternatively, instead of performing the device capability identification workflow time-triggered, user-triggered or event-triggered, the system can perform the workflow continuously, e.g. without delay between two workflows.

Although the second aspect of the invention is illustrated above, partly with reference to some preferred embodiments, it must be understood that numerous modifications and combinations of different features of the embodiments can be made. All of these modifications lie within the scope of the appended claims. In particular, the described system may be configured to execute some or all of the described method steps, and the described method may utilize some or all of the described system components.

What is claimed is:

1. A computer system for controlling access to digital data and algorithms, the computer system comprising:
   a multitude of local systems that are provided at a plurality of remote locations and having a data connection that allows transferring digital data between the local systems, wherein:
     at least a first subset of the multitude of local systems comprises at least one data acquisition device that is adapted to generate and provide raw digital data;
     at least a second subset of the multitude of local systems comprises at least one data processing unit having a memory with a memory capacity and a processor with a computing capacity; and
     each data processing unit is configured to process raw digital data and to generate processed digital data to be presented to one or more of a plurality of users of the system, each user having one of a plurality of roles; and
   a filter system comprising a multitude of filters, wherein at least one filter is assigned at each local system, each filter having a filter setting for restricting and prohibiting data transfer between the assigned local system and other local systems, the filter setting considering at least a legal framework applicable at the location of the assigned local system,
   wherein the computer system is configured to generate one or more abstracted versions of a set of raw or processed digital data, wherein generating the one or more abstracted versions comprises deleting, encrypting or aggregating, based on one or more of the filter settings, information of the set of raw or processed digital data.

2. The computer system according to claim 1, further comprising a decision engine that is configured, upon receiving a request to present a first set of digital data to a first user, to decide in real time and based at least on the filter settings, at which one or more data processing units raw data is to be processed to generate the first set of digital data.

3. The computer system according to claim 2, wherein the decision engine is configured:
   to decide at which one or more data processing units the raw data is to be processed to generate the first set of processed digital data also based on the role of the first user, or
   to decide in real time which information is included in the first set of digital data and how the information is presented to the first user.

4. The computer system according to claim 2, wherein for deciding at which data processing unit raw data is to be processed, the decision engine is configured to execute an optimization based on the filter setting of each local system and further takes into consideration at least a subset of:
   a necessary or desirable processing speed,
   a network latency,
   a role of the first user,
   a necessary or desirable detail level of the raw and/or processed digital data, and
   a utilization of the memory capacities or computing capacities of the computing units.

5. The computer system according to claim 4, wherein the decision engine is configured to execute the optimization based on an actual or forecasted amount of
   raw digital data provided by the measuring devices and/or processed digital data requested to be presented.

6. The computer system according to claim 1, wherein
   the at least one data acquisition device comprises at least one measuring device that is adapted to generate and provide measuring data as raw digital data; and
   each data processing unit is configured to process the measuring data and to generate processed measuring data to be presented to the one or more users.

7. The computer system according to claim 1, wherein the filter settings utilize:
   legal frameworks applicable at a plurality of locations, or
   provisions of a contract applicable at least at the location of the assigned local system,
   wherein deleting information from the set of raw or processed digital data is based on legal frameworks and/or contracts and comprises deleting at least one of personal data,
   information being considered as trade secrets, and information subject to technology transfer restrictions or export control.

8. The computer system according to claim 1, wherein filter settings are defined for at least a subset of possible combinations of user roles and remote locations, and for each of the combinations, filter settings are defined for a present point or period of time and at least one future point or period of time, using a legal framework applicable at the location of the assigned local system at the present point or period of time and at least one future point or period of time.

9. The computer system according to claim 1, wherein
a first local system of the multitude of local systems comprises a plurality of software agents that are adapted to be used with a plurality of electronic apparatuses that are configured as data acquisition devices or measuring devices, wherein each software agent is
installable on an electronic apparatus of the plurality of electronic apparatuses or
installed on a communication module that is adapted to be connected to one of the electronic apparatuses and to exchange data with the apparatus connected to,
wherein each software agent is adapted to exchange data with the electronic apparatus it is installed on or connected to.

10. A computer-implemented method for controlling access to digital data using a computer system comprising a multitude of local systems that are provided at a plurality of remote locations and having a data connection that allows transferring digital data between the local systems, wherein
at least a first subset of the multitude of local systems comprises at least one data acquisition device that is adapted to generate and provide raw digital data;
at least a second subset of the multitude of local systems comprises at least one data processing unit having a memory with a memory capacity and a processor with a computing capacity; and
each data processing unit is configured to process raw digital data and to generate processed digital data to be presented to one or more of a plurality of users of the system, each user having one of a plurality of roles, and
the system comprises a filter system comprising a multitude of filters, wherein at least one filter is assigned at each local system, the method comprising:
defining a filter setting for each filter based at least on a legal framework applicable at the location of the local system to which the filter is assigned, the filter setting restricting and prohibiting data transfer between the assigned local system and other local systems, and
deciding, upon receiving a request to present a first set of digital data to a first user, in real time, by means of a decision engine and based at least on the filter settings, at which one or more data processing units raw data is to be processed to generate the first set of digital data.

* * * * *